(12) United States Patent
Lavoie et al.

(10) Patent No.: US 12,030,566 B2
(45) Date of Patent: Jul. 9, 2024

(54) SUSPENSION SYSTEM AND TRACK SYSTEM HAVING SAME

(71) Applicant: SOUCY INTERNATIONAL INC., Drummondville (CA)

(72) Inventors: Martine Lavoie, St-Jerome (CA); William Brisson, Saint-Cyrille-de-Wendover (CA); Yves Sauvageau, Drummondville (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 18/275,306

(22) PCT Filed: Mar. 16, 2023

(86) PCT No.: PCT/CA2023/050341
§ 371 (c)(1),
(2) Date: Sep. 21, 2023

(87) PCT Pub. No.: WO2023/173216
PCT Pub. Date: Sep. 21, 2023

(65) Prior Publication Data
US 2024/0043077 A1    Feb. 8, 2024

Related U.S. Application Data

(60) Provisional application No. 63/320,241, filed on Mar. 16, 2022.

(51) Int. Cl.
B62D 55/104        (2006.01)

(52) U.S. Cl.
CPC .................. B62D 55/104 (2013.01)

(58) Field of Classification Search
CPC .............................. B62D 55/104; B62D 55/30
See application file for complete search history.

(56) References Cited

U.S. PATENT DOCUMENTS

| | | | | |
|---|---|---|---|---|
| 3,764,184 A | * | 10/1973 | Orr | B62D 55/1086 305/138 |
| 10,124,843 B2 | * | 11/2018 | Sauvageau | B62D 55/125 |
| 2014/0265075 A1 | * | 9/2014 | Gottschalk | B60G 99/002 267/141 |

FOREIGN PATENT DOCUMENTS

CA        3110625 A        3/2020

OTHER PUBLICATIONS

International Search Report for PCT/CA2023/050341, Catherine Soucy, May 19, 2023.

* cited by examiner

*Primary Examiner* — Jacob D Knutson
(74) *Attorney, Agent, or Firm* — BCF LLP

(57) ABSTRACT

The first suspension member is pivotally connectable to a frame assembly of the track system and defines a receptacle. The second suspension member is pivotally connectable to the frame assembly, extends at least partially within the receptacle, and is moveable relative to the first suspension member. The resilient member has a first surface that is generally fixedly connected to the second suspension member and a second surface that is generally fixedly connected to the first suspension member. The first and second suspension members have a first position, and in response to the first and second suspension members moving relative to one another, the resilient member biases the first and second member toward the first position. A track system is also disclosed.

20 Claims, 15 Drawing Sheets

SUSPENSION SYSTEM AND TRACK SYSTEM HAVING SAME

CROSS-REFERENCE TO RELATED APPLICATION

The present application claims priority to U.S. Provisional Patent Application No. 63/320,241, filed Mar. 16, 2022 "Suspension System and Track System Having Same", which is incorporated by reference herein in its entirety.

TECHNICAL FIELD

The present technology relates to suspension systems and to track systems having suspension systems.

BACKGROUND

Certain vehicles, such as, for example, agricultural vehicles (e.g., harvesters, combines, tractors, etc.) and construction vehicles (e.g., bulldozers, front-end loaders, etc.), are used to perform work on ground surfaces that are soft, slippery and/or uneven (e.g., soil, mud, sand, ice, snow, etc.).

Conventionally, such vehicles have large wheels with tires on them to move the vehicle along the ground surface. Under certain conditions, such tires may have poor traction on some ground surfaces and, as these vehicles are generally heavy, the tires may compact the ground surface in an undesirable way owing to the weight of the vehicle. As an example, when the vehicle is an agricultural vehicle, the tires may compact the soil in such a way as to undesirably inhibit the growth of crops. In order to reduce the aforementioned drawbacks, to increase traction and to distribute the weight of the vehicle over a larger area on the ground surface, track systems were developed to be used in place of at least some of the wheels and tires on the vehicles.

The use of track systems in place of wheels and tires, however, does itself present some inconveniences. One of the drawbacks of conventional track systems is their suspension systems are often costly and can be difficult to replace and/or adjust, depending on the purpose of the track system.

In view of the foregoing, there is a need for a suspension system that addresses at least some of these drawbacks.

SUMMARY

It is therefore an object of the present technology to ameliorate the situation with respect to at least one of the inconveniences present in the prior art.

According to an aspect of the present technology, there is provided a suspension system for a track system. The suspension system includes a first suspension member, a second suspension member and a resilient member. The first suspension member is pivotally connectable to a frame assembly of the track system, and defines a receptacle. The second suspension member is pivotally connectable to the frame assembly of the track system, and extends at least partially within the receptacle. The second suspension member is moveable relative to the first suspension member. The resilient member has a first surface and a second surface, the first surface being generally fixedly connected to the second suspension member and the second surface being generally fixedly connected to the first suspension member. The first and second suspension members have a first position, and in response to the first and second suspension members being offset from the first position, the resilient member biases the first and second suspension members toward the first position.

In some embodiments, in response to the first suspension member moving relative to the second suspension member, the resilient member undergoes at least shear deformation.

In some embodiments, the resilient member undergoes shear deformation along a length of the resilient member.

In some embodiments, the resilient member includes a first fillet at the first surface and a second fillet at the second surface.

In some embodiments, the resilient member is generally conical, and the leading and trailing suspension members are generally cylindrical.

In some embodiments, the resilient member is a first resilient member having the first surface and the second surface, and the suspension system further includes a second resilient member having a third surface and a fourth surface. The first surface of the first resilient member is connected to the second suspension member and the second surface of the first resilient member is connected to the first suspension member. The third surface of the second resilient member is connected to the second suspension member and the fourth surface of the second resilient member is connected to the first suspension member.

In some embodiments, the first and second resilient members are symmetrical about a longitudinally extending symmetry plane disposed between the first and second resilient members.

In some embodiments, the first and second resilient members each generally define a parallelogram shape.

In some embodiments, the first suspension member includes a first portion and a second portion. The first portion is pivotally connectable to a frame assembly of the track system, and the second portion defines the receptacle, the second portion being operatively connected to the first portion. The first portion is moveable relative to the second portion.

In some embodiments, a connecting resilient member is disposed between the first and second portions.

In some embodiments, in response to the first suspension member moving relative to the second suspension member, the first portion moves relative to the second portion, and the connecting resilient member undergoes a compressive deformation.

In some embodiments, the second portion is made of a plurality of selectively connected walls.

In some embodiments, the suspension system further includes a stopper for stopping the movement of the first suspension member relative to the second suspension member.

In some embodiments, the suspension system further includes a resilient stopper for dampening the movement of the first suspension member relative to the second suspension member.

In some embodiments, the receptacle generally defines a U-shape.

In some embodiments, the suspension system is a replacement for a shock absorber.

In some embodiments, the frame assembly includes a first frame member and a second frame member, the first and second frame members being pivotally connected to one another about a first pivot.

In some embodiments, the frame assembly includes a first frame member, a second frame member and a mounting plate having a first pivot and a second pivot, the first frame member being pivotable about the first pivot, and the second frame member being pivotable about the second pivot.

In some embodiments, the first and second suspension members are configured to move away from one another.

In some embodiments, the first and second suspension members are configured to move toward one another.

In some embodiments, the suspension system is a tensioner.

In some embodiments, the tensioner is operatively connected to an idler wheel assembly of the track system for tensioning an endless track of the track system.

In another aspect of the present technology, there is provided a track system including an attachment assembly, a frame assembly, the suspension system according to the above aspect or according to the above aspect and one or more of the above embodiments, a sprocket wheel assembly, a plurality of support wheel assemblies and an endless track. The attachment assembly has a lateral pivot. The frame assembly, which is disposed on a lateral side of the attachment assembly, includes a first frame member pivotally connected to the lateral pivot, and a second frame member pivotally connected to the lateral pivot. The suspension system is operatively connected to the first and second frame members. The sprocket wheel assembly and the plurality of support wheel assembly are rotationally connected to the frame assembly. The endless track surrounds the frame assembly, the suspension system, the drive wheel assembly and the plurality of support wheel assemblies.

In some embodiments, the suspension system further includes a third suspension member, a fourth suspension member and a third resilient member. The third suspension member is pivotally connected to one of the first and second frame members, and defines a second receptacle. The fourth suspension member is pivotally connected to another one of the first and second frame members, and extends at least partially within the second receptacle. The fourth suspension member is moveable relative to the third suspension member. The third resilient member has a fifth surface and a sixth surface, the fifth surface being generally fixedly connected to the third suspension member and the sixth surface being generally fixedly connected to the fourth suspension member. The third and fourth suspension members have a second position, and in response to the third and fourth suspension members moving relative to one another, the third resilient member biasing the third and fourth suspension member toward the second position. The third suspension member, the fourth suspension member and the third resilient member are connected to the first and second frame members in parallel to the first suspension member, the second suspension member and the resilient member.

In another aspect of the present technology, there is provided a track system including an attachment assembly, a frame assembly, the suspension system according to the above aspect or according to the above aspect and one or more of the above embodiments, a sprocket wheel assembly, a plurality of support wheel assemblies and an endless track. The attachment assembly has a first lateral pivot and a second lateral pivot. The frame assembly, which is disposed on a lateral side of the attachment assembly, includes a first frame member pivotally connected to the first lateral pivot, and a second frame member pivotally connected to the second lateral pivot. The suspension system is operatively connected to the first and second frame members. The sprocket wheel assembly and the plurality of support wheel assemblies are rotationally connected to the frame assembly. The endless track surrounds the frame assembly, the suspension system, the drive wheel assembly and the plurality of support wheel assemblies.

In some embodiments, the suspension system is a first suspension system, and the track system includes a second suspension system, the first and second suspension systems being connected to the first and second frame members in parallel.

In another aspect of the present technology, there is provided a track system including a frame assembly, a sprocket wheel assembly, a plurality of wheel assemblies, a tensioner assembly including the suspension system according to the above aspect or according to the above aspect and one or more of the above embodiments and an endless track. The sprocket wheel assembly is rotationally connected to the frame assembly. The plurality of wheel assemblies includes an idler wheel assembly pivotally connected to the frame assembly. The tensioner assembly is operatively connected to the idler wheel assembly and to the frame assembly, and bias the idler wheel assembly away from the frame assembly. The endless track surrounding the frame assembly, the sprocket wheel assembly, the plurality of wheel assemblies, and the tensioner assembly.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
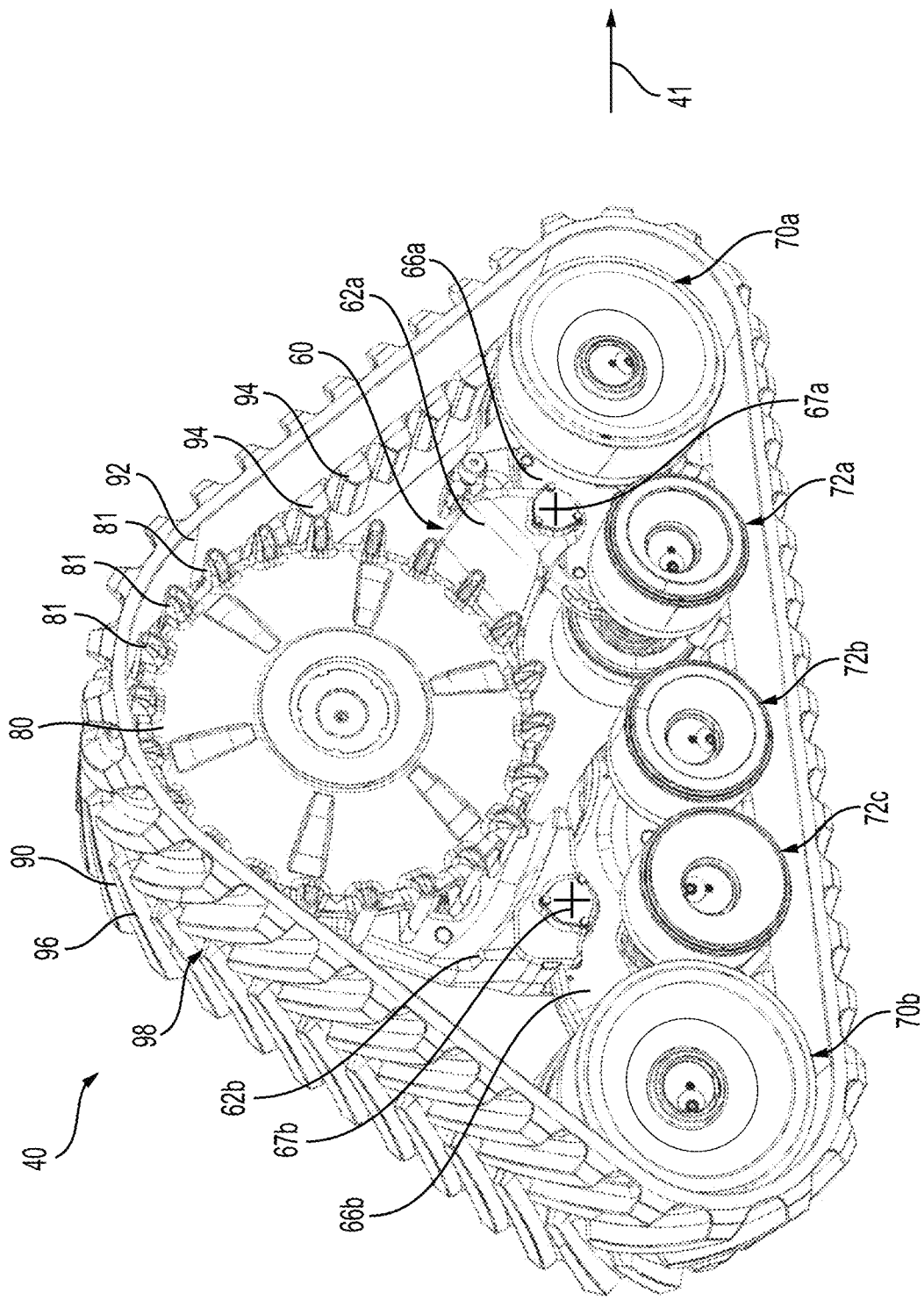
FIG. 1 is a perspective view taken from a rear, top, right side of a track system according to an embodiment of the present technology.
Figure 2:
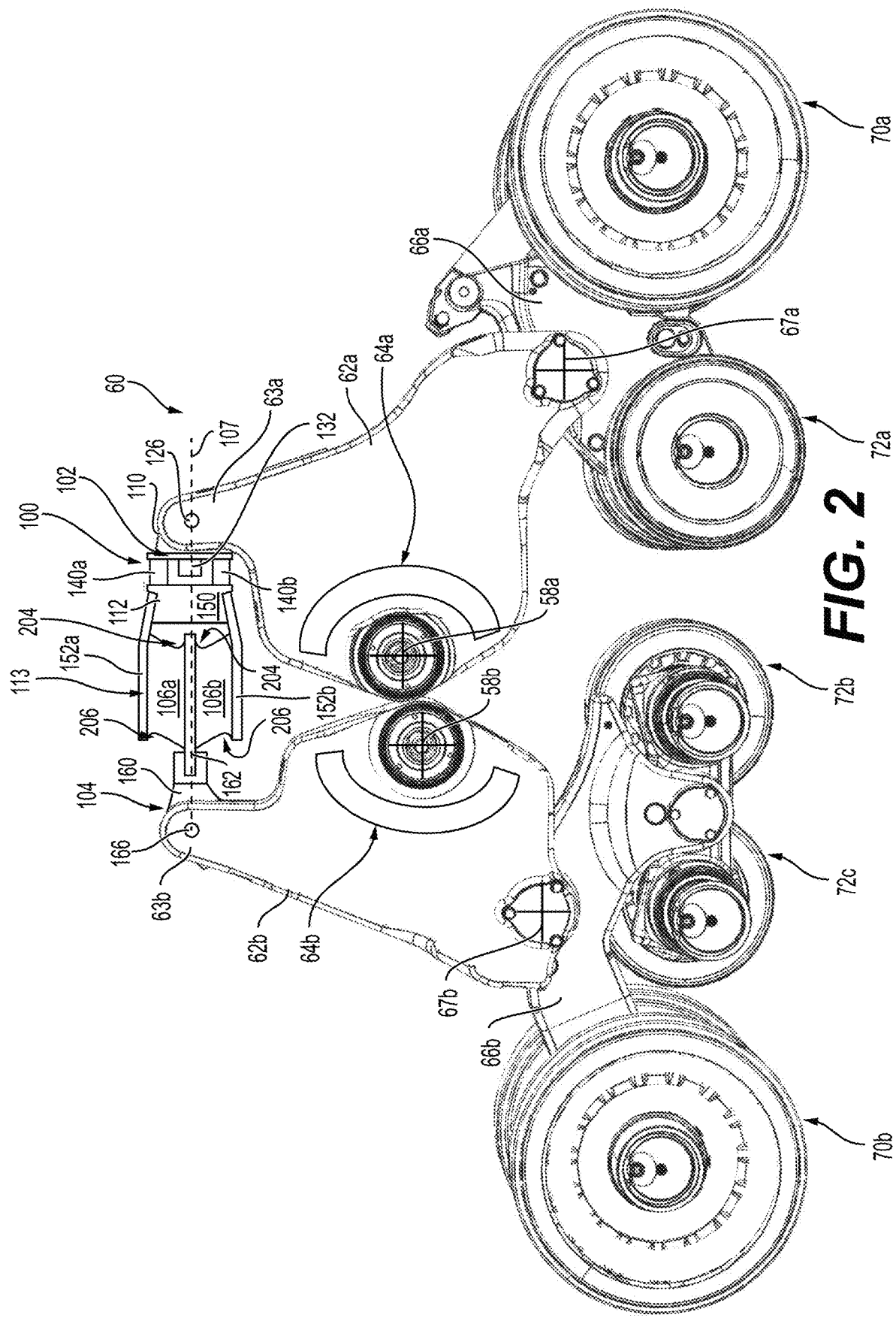
FIG. 2 is a right side elevation view of a part of the track system of FIG. 1, including a frame assembly, front and rear idler wheel assemblies, support wheel assemblies and a suspension system.
Figure 3:
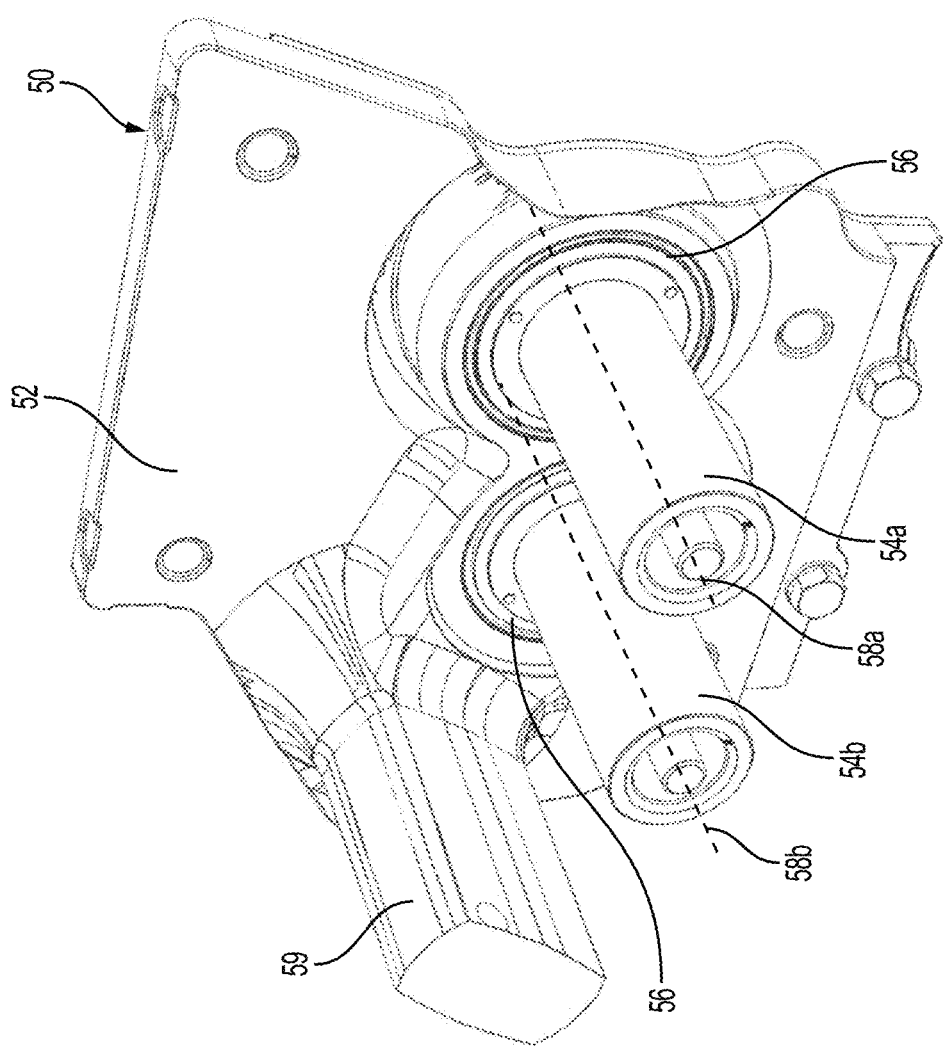
FIG. 3 is a perspective view taken from a front, top, right side of an attachment assembly of the track system of FIG. 1.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including", "comprising", or "having", "containing", "involving" and variations thereof herein, is meant to encompass the items listed thereafter as well as, optionally, additional items. In the following description, the same numerical references refer to similar elements.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

As used herein, the term "about" in the context of a given value or range refers to a value or range that is within 20%, preferably within 10%, and more preferably within 5% of the given value or range.

As used herein, the term "and/or" is to be taken as specific disclosure of each of the two specified features or components with or without the other. For example "A and/or B" is to be taken as specific disclosure of each of (i) A, (ii) B and (iii) A and B, just as if each is set out individually herein.

In the context of the following description, "outwardly" or "outward" means away from a longitudinal center plane of the track system, and "inwardly" or "inward" means toward the longitudinal center plane. In addition, in the context of the following description, "longitudinally" means in a direction parallel to the longitudinal center plane of the track system in a plane parallel to flat level ground, "laterally" means in a direction perpendicular to the longitudinal center plane in a plane parallel to flat level ground, and "generally vertically" means in a direction contained in the longitudinal center plane along a height direction of the track system generally perpendicular to flat level ground. Also, the term "wheel assemblies" include all the necessary structure (bearing structures, pins, axles and other components) to permit a structure/wheel to pivot/rotate about an axis, as the case may be. In the following description and accompanying Figures, the track system is configured to be attached to a right side of the chassis of the vehicle.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Referring to FIG. 1, the present technology will be described with reference to a track system 40, the forward direction of which is indicated by arrow 41. The track system 40 is operatively connectable to a vehicle (not shown). Specifically, the track system 40 is operatively connectable to a shaft of the vehicle and a chassis of the vehicle. In the present description, the track system 40 is described as being operatively connected to a driving shaft. It is contemplated, however, that the shaft could not be a driving shaft. In some embodiments, the vehicle is an agricultural vehicle such as a harvester, a combine or a tractor. In other embodiments, the vehicle is a construction vehicle such as a bulldozer, a skid-steer loader, an excavator or a compact track loader. In yet other embodiments, the vehicle is an all-terrain-vehicle such as a snowmobile, a side-by-side vehicle or utility-terrain vehicles. It is further contemplated that the present technology could be used with industrial and military vehicles as well. It is also contemplated that the present technology could be used with trailers or other unpowered vehicles.

The track system 40 will be generally described with reference to FIGS. 1, 2, 3, 4A and 4B. A more detailed description of the track system 40 can be found in U.S. Pat. No. 10,124,843, the entirety of which is incorporated by reference herein.

The track system 40 includes an attachment assembly 50 (best seen in FIG. 3) that is connectable to the chassis of the vehicle. The attachment assembly 50 includes a plate 52, a leading pivot 54a and a trailing pivot 54b. The leading and trailing pivots 54a, 54b, which extend perpendicularly to the plate 52, are rotationally connected to the plate 52 by bearings 56. The leading and trailing pivots 54a, 54b respectively define leading and trailing pivot axes 58a, 58b. The plate 102 also includes a stopper 59 that extends perpendicular to the plate 52. The stopper 59 is integral to the plate 52. In other embodiments, the stopper 59 could be selectively connected to the plate 52.

The track system 40 further includes a frame assembly 60 disposed on a lateral side of the attachment assembly 50. The frame assembly 60 is a multi-member frame assembly.

The frame assembly 60 includes a leading frame member 62a pivotally connected to the attachment assembly 50 by the leading pivot 54a for pivoting about the leading pivot axis 58a. The frame assembly 60 also includes a trailing frame member 62b pivotally connected to the attachment assembly 50 by the trailing pivot 54b for pivoting about the trailing pivot axis 58b. The leading frame member 62a defines an arcuate aperture 64a, and the trailing frame member 62b defines an arcuate aperture 64b. In the present embodiment, the aperture 64b is configured to receive the stopper 59 therein so as to limit the pivotal movement of the trailing frame member 62b about the trailing pivot axis 58b. It is contemplated that in other embodiments, the mounting attachment 50 could be configured so that the stopper 59 is received in the leading aperture 64a to limit the pivotal movement of the leading frame member 62a about the leading pivot axis 58a. The leading and trailing frame members 62a, 62b are interconnected by a suspension system 100, which will be described in greater detail below.

The frame assembly 60 also includes a leading wheel-bearing frame member 66a pivotally connected to the leading frame member 62a, and a trailing wheel-bearing frame member 66b pivotally connected to the trailing frame member 62b. The leading and trailing wheel-bearing frame members 66a, 66b can pivot relative to, respectively, the leading and trailing frame members 62a, 62b about, respectively, leading and trailing wheel-bearing pivot axes 67a, 67b. This can assist in helping the track system 40 conform to irregularities in the ground during operation.

The track system 40 further includes a leading idler wheel assembly 70a, a trailing idler wheel assembly 70b, and three support wheel assemblies 72a, 72b, 72c disposed longitudinally between the leading and trailing idler wheel assemblies 70a, 70b. The leading idler wheel assembly 70a and the support wheel assembly 72a are rotationally connected to the wheel-bearing frame member 66a, the support wheel assembly 72a being disposed longitudinally rearward from the leading idler wheel assembly 70a. The trailing idler wheel assembly 70b and the support wheel assemblies 72b, 72c are rotationally connected to the trailing wheel-bearing frame member 66b. The support wheel assemblies 72b, 72c, which are connected to the trailing wheel-bearing frame member 66b by a tandem, are disposed longitudinally forward from the trailing idler wheel assembly 70b. It is contemplated that in other embodiments, the support wheel assemblies 72b, 72c could be directly rotationally connected to the trailing wheel-bearing frame member 66. It is contemplated that in some embodiments, the track system 40 could have more or fewer than three support wheel assemblies. Each of the leading and trailing idler wheel assemblies 70a, 70b and the support wheel assemblies 72a, 72b, 72c includes two laterally spaced wheels. It is contemplated that in some embodiments, at least one of the leading and trailing idler wheel assemblies 70a, 70b and the support wheel assemblies 72a, 72b, 72c could be provided with a single wheel in the lateral direction.

The track system 40 also includes the suspension system 100 which is pivotally connected to upper portions 63a, 63b of the leading and trailing frame members 62a, 62b. When the track system 40 does not bear any load, the suspension system 100 is in an unloaded configuration (i.e., in an unloaded state). As will be described in greater detail below, when the track system 40 bears a load, such as a portion of a weight of the vehicle, the leading and trailing frame members 62a, 62b pivot about, respectively, the leading and trailing pivot axes 58a, 58b, toward one another, causing the suspension system 100 to be under stress (i.e., to be in a loaded state), and to be in initial configuration. Given that the suspension system 100 is under stress, the suspension system 100 applies biasing forces that bias the leading and trailing frame members 62a, 62b away from one another, toward the unloaded configuration. More specifically, the suspension system 100 biases upper portions 63a, 63b of the leading and trailing frame members 62a, 62b away from each other. The suspension system 100 provides for a damped pivotal motion of the leading and trailing frame members 62a, 62b relative to each other. In some embodiments, the suspension system 100 replaces a shock absorber. The suspension system 100 will be described in greater detail below.

Figure 4A:
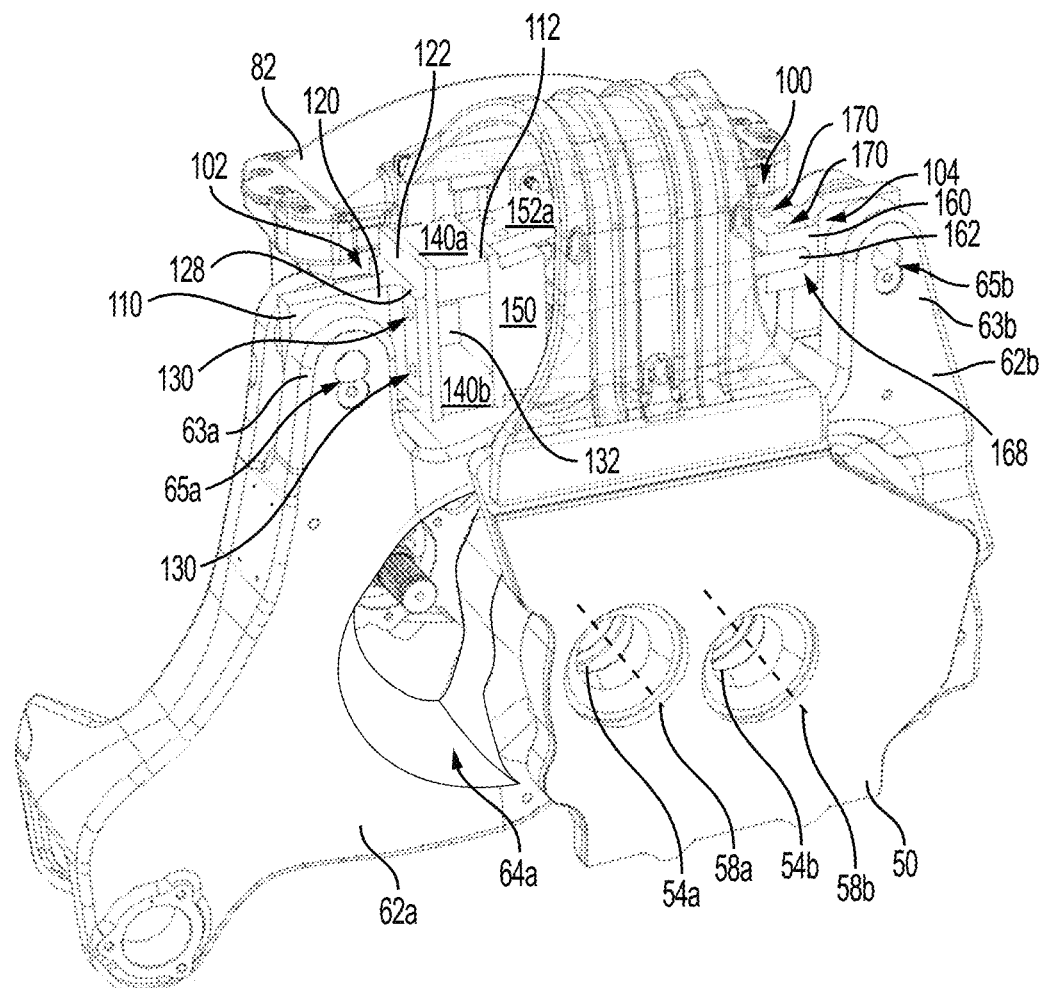
FIG. 4A is a perspective view taken from a front, top, left side of another part of the track system of FIG. 1, including a portion of the frame assembly and the suspension system of FIG. 2 and the attachment assembly of the FIG. 3.
Figure 4B:
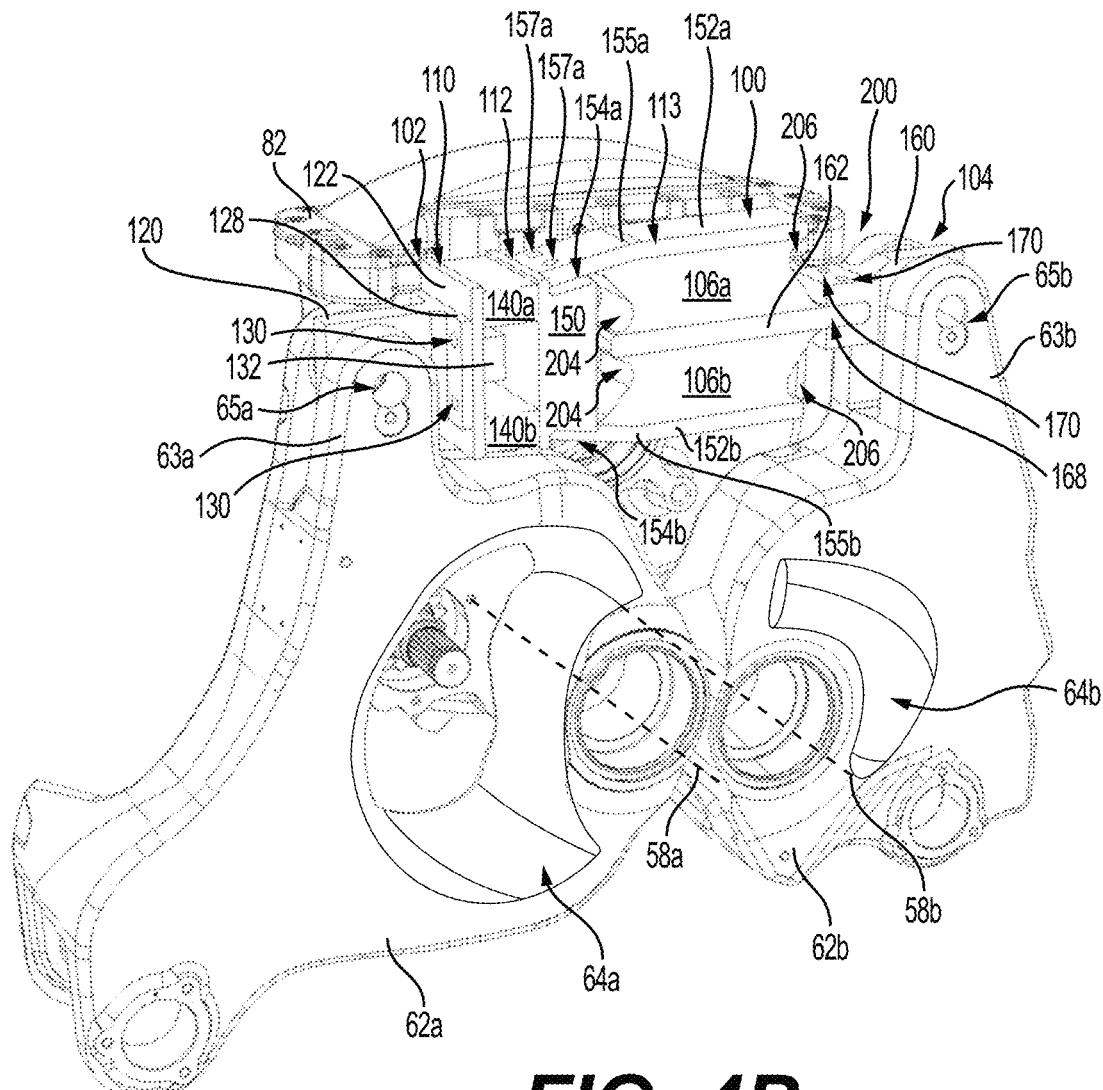
FIG. 4B is a perspective view taken from a front, top, left side of the other part of the track system of FIG. 4A, with the attachment assembly being omitted.

The track system 40 further includes a sprocket wheel assembly 80 that is operatively connected to the shaft of the vehicle by a gearbox 82 (shown in FIGS. 4A and 4B). The gearbox 82, which is laterally spaced from the sprocket wheel assembly 80, is operatively connected to both the shaft of the vehicle and the sprocket wheel assembly 80. The gearbox 82 transmits rotational motion of the shaft to the sprocket wheel assembly 80. The sprocket wheel assembly 80 has teeth 81 which are configured to engage lugs 94 of an endless track 90.

The track system 40 further includes the endless track 90. The endless track 90 surrounds the frame assembly 60, the leading and trailing idler wheel assemblies 70a, 70b, the support wheel assemblies 72a, 72b, 72c, the sprocket wheel assembly 80 and the suspension system 100. The endless track 90, which is an endless polymeric track, is drivable by the sprocket wheel assembly 80. The endless track 90 has an inner surface 92 engaging the leading and trailing idler wheel assemblies 70a, 70b, the support wheel assemblies 72a, 72b, 72c and the sprocket wheel assembly 80. The inner surface 92 has the lugs 94 disposed on a central portion thereof. It is contemplated that in other embodiments, the inner surface 92 could have two or more sets of laterally spaced lugs. The endless track 90 also has an outer surface 96 with a tread 98 configured for ground engagement. The tread 98 can be varied according to the type of vehicle on which the track system 40 is to be used with and/or the type of ground surface on which the vehicle will be driven. It is contemplated that within the scope of the present technology, the endless track 90 may be constructed of a wide variety of materials and structures including metallic components known in track systems. The specific properties and materials of the endless track 90 are not central to the present technology and will not be described in detail.

Referring to FIGS. 4A, 4B, 5, 6A and 6B, an embodiment of the suspension system 100 will now be described in greater detail. The suspension system 100 includes a leading suspension member 102 that is pivotally connected to the leading frame member 62a, a trailing suspension member 104 that is pivotally connected to the trailing frame member 62b, and upper and lower resilient members 106a, 106b that are connected to the leading and trailing suspension members 102, 104.

The leading suspension member 102 has a connecting portion 110 and a receptacle portion 112 that is operatively connected to the connecting portion 110.

Focusing first on the connecting portion 110, the connecting portion 110 includes a frame connecting part 120 and a receptacle connecting part 122. The frame connecting part 120 defines a circular aperture 124 that is configured to receive a fastener 126 (shown in FIG. 2) therein. The fastener 126 is also received in apertures 65a (shown in FIG. 4B) defined in the leading frame member 62a, enabling a pivotal connection between the leading suspension member 102 and the leading frame member 62a. It is contemplated that in some embodiments, the circular aperture 124 could define another shape. It is also contemplated that in some embodiments, the circular aperture 124 could be omitted, and the frame connecting portion 120 could be pivotally connected to the leading frame member 62a differently, for example by having a shaft extending therefrom. The frame connecting part 120 has a laterally extending segment 128 that extends in both lateral directions and that defines four apertures 130 (only two apertures shown in accompanying Figures) configured to receive fasteners (not shown) therein. The frame connecting part 120 also has a stopper 132 that extends longitudinally forward (best seen in FIG. 6B) from the laterally extending segment 128. The receptacle connecting part 122 defines four apertures 134 (only two shown in FIG. 6A) that are aligned with the four apertures 130, such that the frame and receptacle connecting parts 120, 122 can be connected to one another via fasteners. It is contemplated that in some embodiments, the frame and receptacle connecting parts 120, 122 could be integral, such that the connecting portion 110 is made of one single part. Furthermore, the receptacle connecting part 122 defines a stopper receiving aperture 136 that is configured to receive the stopper 132 of the frame connecting part 120. It is contemplated that in other embodiments, the stopper 132 could be disposed elsewhere. For example, in some embodiments, the stopper 132 could be disposed on the receptacle connecting portion 122 or on a side part 150 of the receptacle portion 112, rather than the frame connecting part 120.

The connecting portion 110 of the suspension system 100 also includes upper and lower connecting resilient members 140a, 140b. The upper and lower connecting resilient member 140a, 140b are disposed, respectively, above and below the stopper 132. As will be described below, it is contemplated that in some embodiments, the upper and lower connecting resilient members 140a, 140b could be omitted. In some embodiments, there could be more or less than two connecting resilient members. The upper and lower resilient members 140a, 140b are connected to the connecting and receptacle portions 110, 112 via an adhesive. Other connection methods such as overmolding are contemplated. The upper and lower resilient members 140a, 140b are polymeric members. It is contemplated, however, that the upper and lower resilient members 140a, 140b could be other resilient members such as springs. As will be described in greater detail below, the upper and lower resilient members 140a, 140b are resiliently deformed when the connecting and receptacle portions 110, 112 move toward one another.

Still referring to FIGS. 4A, 4B, 5, 6A and 6B, turning now to the receptacle portion 112, which defines a receptacle 113 that generally defines a U-shape. The receptacle portion 112 includes the side part 150 and upper and lower parts 152a, 152b. A leading surface of the side part 150 is connected to the upper and lower resilient members 140a, 140b. It is contemplated that in some embodiments, the stopper 132 could extend from the leading surface of the side part 150, toward the connecting portion 110. The side part 150 defines upper and lower recesses 154a, 154b, which are configured to receive, respectively, portions of the upper and lower parts 152a, 152b. Within the upper recess 154a, the side part 150 defines upper connecting apertures (not shown). Similarly, within the lower recess 154b, the side part 150 defines lower connecting apertures 156b. The side part 150 further defines a V-shaped recess 158, such that the side part 150 has an upper tapered portion 159a, a lower tapered portion 159b, and an abutting channel 159c extending between the upper and lower tapered portions 159a, 159b. As will be described in greater detail below, in some instances, when the suspension system 100 is under load, the leading frame suspension member 102 can be partially received in the V-shaped recess 158, and in some instances, can abut the abutting channel 159c.

The upper part 152a defines, at a leading end thereof, upper connecting apertures 157a. Likewise, the lower part 152b defines, at a leading end thereof, lower connecting apertures (not shown). When the side, upper and lower parts 150, 152a, 152b are connected, upper fasteners 116a (shown in FIG. 6A) are received through the upper connecting apertures 157a of the upper part 152a and the connecting apertures (not shown) of the side part 150, and lower fasteners 116b (shown in FIG. 6A) are received through the lower connecting apertures (not shown) of the lower part 152b and the lower connecting apertures 156b of the side part 150. The upper and lower parts 152a, 152b respectively have angled sections 155a, 155b. The angled sections 155a, 155b can help provide clearance so as to not abut the leading and trailing frame members 62a, 62b. Specifically, when the suspension system 100 is operatively connected to the leading and trailing frame members 62a, 62b and the leading and trailing frame members 62a, 62b pivot about, respectively, the leading and trailing pivot axes 54a, 54b, the suspension system 100, most notably the lower part 152b, does not abut one of the leading and trailing frame members 62a, 62b, which would restrict range of motion of the leading and trailing frame members 62a, 62b. It is contemplated that in some embodiments, the angled sections 155a, 155b could be omitted.

It is contemplated that in some embodiments, the side part 150 and the upper and lower part 152a, 152b could be connected differently, for instance without portions of the upper and lower parts 152a,152b being received in the upper and lower recesses 154a, 154b. It is further contemplated that in some embodiments, the side part 150 and the upper and lower parts 152a, 152b could be integral.

Focusing now on the trailing suspension member 104, the trailing suspension member 104 includes a connecting part 160 and an elongate part 162.

The connecting part 160 defines, at a trailing end thereof, a circular aperture 164 that is configured to receive a fastener 166 (shown in FIG. 2) therein. The fastener 166 is also received in apertures 65b (shown in FIG. 4A) defined in the trailing frame member 62b, enabling a pivotal connection between the trailing suspension member 104 and the trailing frame member 62b. As mentioned above, it is contemplated that in some embodiments, the circular aperture 164 could define another shape. It is also contemplated that in some embodiments, the circular aperture 164 could be omitted, and the frame connecting portion 160 could, instead, have a shaft extending therefrom. The connecting part 160 also defines, at a leading end thereof, a longitudinally extending recess 168 that is configured to receive part of the elongate part 162. Additionally, the connecting part 160 further defines two upper and lower connecting apertures 170 (only upper connecting shown herewith). The two upper connecting apertures 170 and the two lower connecting apertures 170 are laterally spaced. As a result, the elongate part 162 can generally fixed relative to the connecting part 160 (i.e., no pivotal movement) via fasteners.

The elongate part 162, which is partially received in the longitudinally extending recess 168, also defines two connecting apertures (not shown) that are aligned with the upper and lower apertures 170. Fasteners 172 are received through the connecting apertures 170 of the connecting part 160 and through the connecting apertures (not shown) of the elongate part 162, thereby connecting the connecting and elongate parts 160, 162 to one another. In the present embodiment, the fasteners 172 are nuts and bolts. It is contemplated that in some embodiments, the connecting and elongate parts 160, 162 could be integral.

In the present embodiment, the upper and lower parts 152a, 152b are removably connected to the side part 150, and the connecting part 160 is removably connected to the elongate part 162. As will be described below, this can be useful to replace the upper and lower resilient members 106a, 106b.

The suspension system 100 also has the upper and lower resilient members 106a, 106b, which are received within the receptacle 113 and which are made of polymeric material. The upper resilient member 106a has an inner surface 200a that is fixedly connected to an upper surface of the elongate part 162 of the trailing suspension member 104 (e.g., via an adhesive), and an outer surface 202a that is fixedly connected to an inner surface of the upper part 152a of the leading suspension member 102 (e.g., via an adhesive). Similarly, the lower resilient member 106b has an inner surface 200b that is fixedly connected to a lower surface of the elongate part 162 of the trailing suspension member 104 (e.g., via an adhesive), and an outer surface 202b that is fixedly connected to an inner surface of the lower part 152b of the leading suspension member 102 (e.g., via an adhesive). It is contemplated that in some embodiments, the upper and lower resilient members 106a, 106b could be connected to the leading and trailing suspension members 102, 104 differently, for example by overmolding or by a combination of overmolding and adhesive. For instance, in some embodiments, instead of using an adhesive, the upper resilient member 106a could be press-fitted between the elongate part 162 and the upper part 152a, and the lower resilient member 106b could be press-fitted between the elongate part 162 and the lower part 152b. In some embodiments, there could be a layer of Ultra-High-Molecular-Weight (UHMW) disposed between the upper and lower resilient members 106a, 106b and the receptacle 113 and/or the elongated part 162 to ensure sufficient chemical bonding therebetween. In other embodiments, the receptacle 113 could be made of UHMW.

Figure 5:
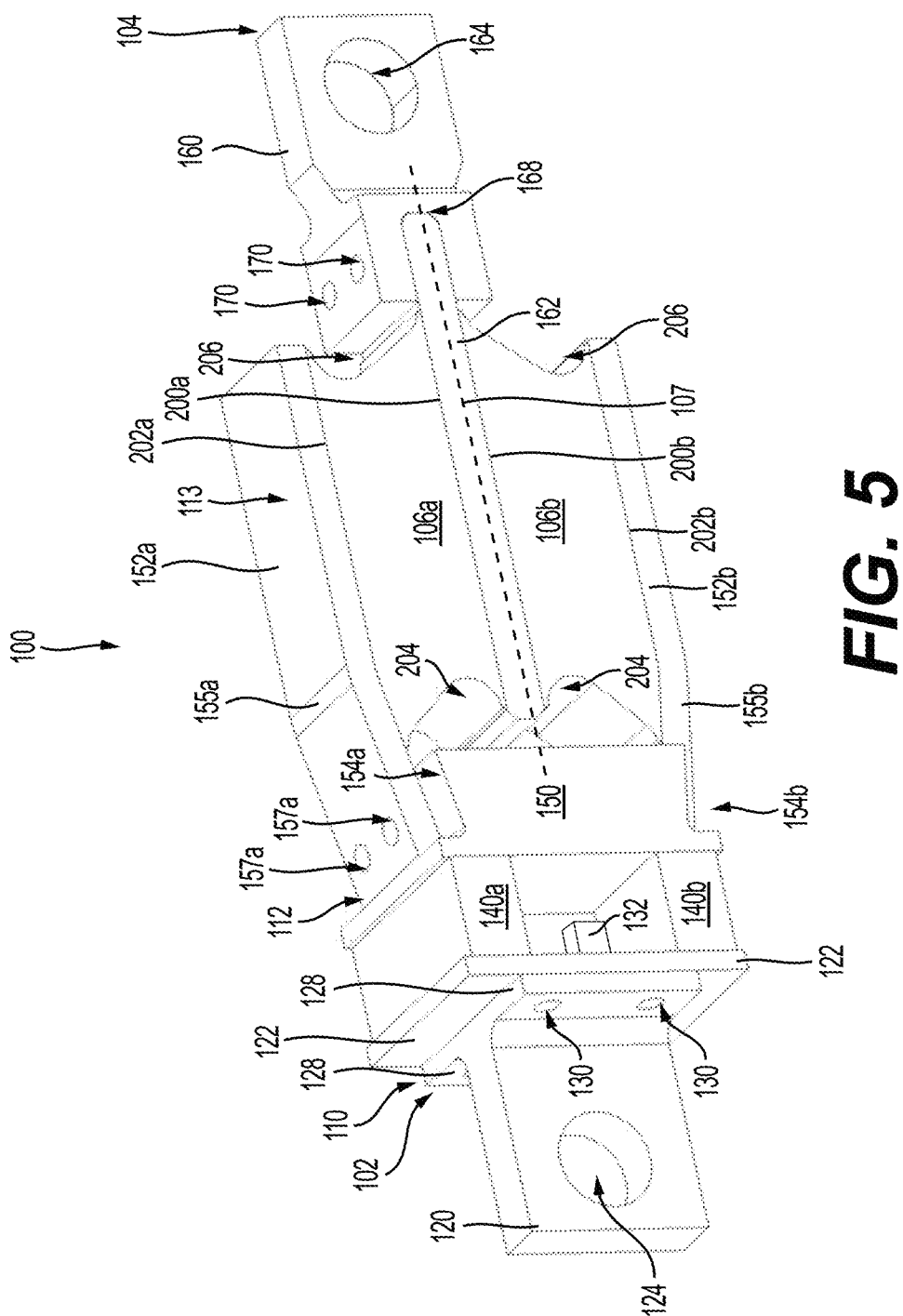
FIG. 5 is a perspective view taken from front, top, left side of the suspension system of FIG. 2.
Figure 6A:
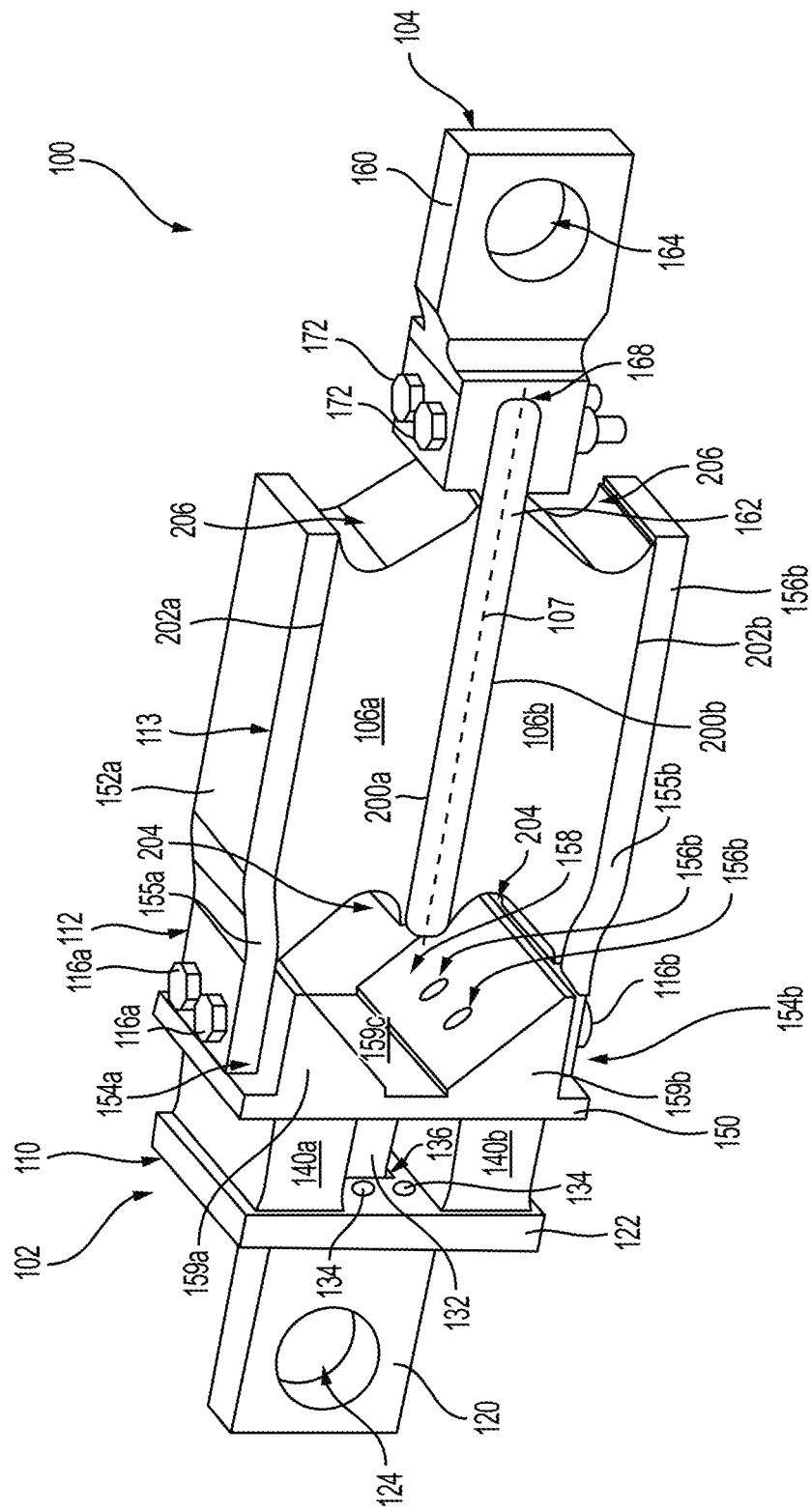
FIG. 6A is a perspective view taken from rear, top, left side of the suspension system of FIG. 2.
Figure 7B:
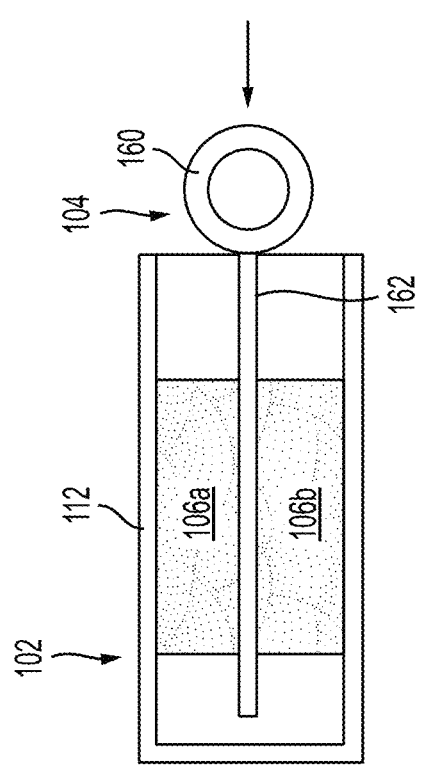
FIG. 7B is a schematic side elevation view of the suspension system of FIG. 2 in the contracted configuration.
Figure 7D:
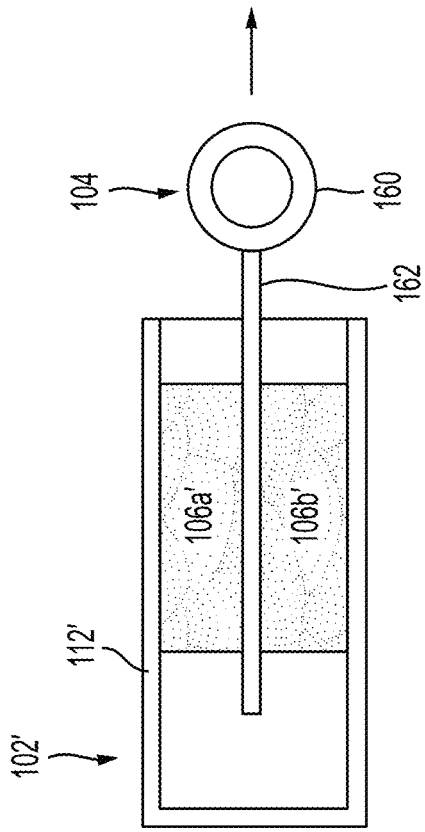
FIG. 7D is schematic side elevation view of the suspension system of FIG. 7C in a loaded configuration.
Figure 7A:
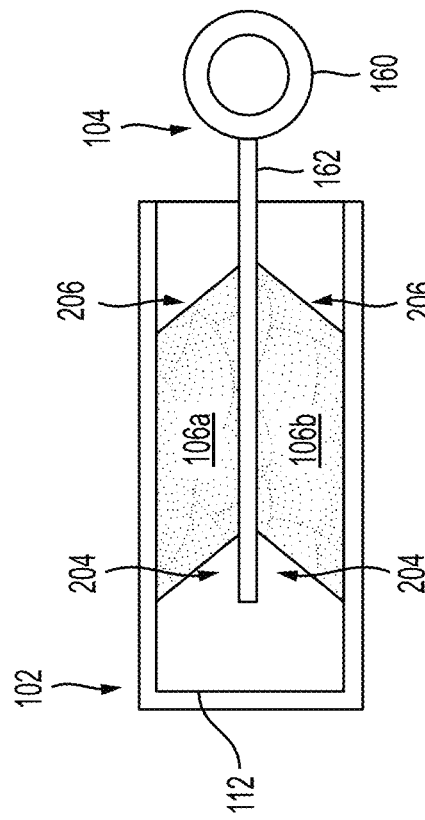
FIG. 7A is a schematic side elevation view of the suspension system of FIG. 2 in an unloaded configuration.

In the present embodiment, the upper and lower resilient members 106a, 106b are symmetrical about a longitudinal symmetry plane 107 passing through a center of the elongate part 162. For this reason, only the upper resilient member 106a will be described in detail herewith. As shown in FIGS. 5, 6A and FIG. 7A, the upper resilient member 106a generally defines a parallelogram shape when the suspension system 100 is in the unloaded configuration (i.e., when the upper resilient member 106a is an unloaded position). As will be described below, and as shown in FIG. 7B, in some embodiments, upon deformation of the upper resilient member 106a, the upper resilient member 106a can generally define a rectangular shape in a loaded position. The orientation of the parallelogram could vary depending on the direction that the leading and trailing suspension members 102, 104 move relative to another. The upper resilient member 106a further defines an inner fillet 204 on the leading end of the inner surface 200a and an outer fillet 206 on the trailing end of the outer surface 202a. The shape of the upper resilient member 106a and the presence of the inner and outer fillets 204, 206 increase contact area between resilient member 106a and the leading and trailing suspension member 102, 104. This, as will be described below, can reduce the likelihood of the resilient member 106a from deforming in a manner such that the elongate part 162 moves vertically upwardly or downwardly and/or laterally outwardly from the receptacle 113. Additionally, the shape of the upper resilient member 106a can increase range of motion of the leading suspension member 102 relative to the trailing suspension member 104. Thus, it is contemplated that in other embodiments, the upper resilient member 106a could have another shape for increasing or decreasing the range of motion of the leading suspension member 102 relative to the trailing suspension member 104. In the present embodiment, the upper resilient member 106a has a shear modulus of rigidity, compressive modulus of rigidity and a tensile modulus of rigidity. The shear modulus of rigidity is less than the compressive modulus of rigidity and the tensile modulus of rigidity, and the tensile modulus of rigidity is less than the compressive modulus of rigidity. Thus, when the upper resilient member 106a is subjected to loads due to the relative moment of the leading and trailing suspension member 102, 104, the upper resilient member 106a first undergoes shear deformation, followed by tensile and compressive deformations. It is contemplated that the upper resilient member 106a could be replaced with a different member that has different elastomeric properties, and therefore provides different biasing and dampening effects.

As mentioned above, the upper and lower parts 152a, 152b can be disconnected from the side part 150, and the elongate part 162 can be disconnected from the connecting part 160 (i.e., the upper and lower parts 152a, 152b are selectively connected to the side part 150), such that the upper and lower resilient members 106a, 106b can easily be replaced when desired. For example, if, for a given reason, different elastomeric properties are desired, the upper and lower resilient members 106a, 106b can be replaced with other resilient members having different elastomeric properties. In another example, when the upper and lower resilient members 106a, 106b reach the end of their life, they can be replaced without needing to replace the rest of the suspension system 100.

With reference to FIGS. 4A, 4B, 5, 6A, 6B, 7A and 7B, the suspension system 100 in operation will now be described. According to the present embodiment, the upper and lower resilient members 106a, 106b of the suspension system 100 are configured to deform as the leading and trailing suspension members 102, 104 move towards one another. However, as will be described below, it is contemplated that the upper and lower resilient members 106a, 106b of the suspension systems 100 could be configured to deform as the leading and trailing suspension members 102, 104 move away from one another. The orientation of the upper and lower resilient members 106a, 106b could change from one embodiment to another.

The suspension system 100 is moveable between an unloaded configuration, an initial configuration and a contracted configuration, where the initial configuration is intermediate to the unloaded and contracted configuration. It is to be noted that when the suspension is in the initial and contracted configurations, the suspension system 100 is in a loaded state. The suspension system 100 is in the unloaded configuration (schematically shown in FIG. 7A) when the track system 40 is not under load. The suspension system 100 is in the initial configuration when the track system 40 is connected to a vehicle, and bears a load thereof. The suspension system 100 is in the contracted configuration (shown in FIG. 7B) when the track system 40 moves so that the leading and trailing suspension members 102, 104 move relative to one another. It is understood that the suspension system 100 has a plurality of contracted configurations.

In the present embodiment, the track system 40 can encounter obstacles such as rocks, ditches and/or bumps. The track system 40 is configured to, at least partially, conform to the encountered obstacles, which can help overcome said obstacles. For example, the leading and trailing wheel-bearing members 66a, 66b can pivot relative to the frame members 62a, 62b about the leading and trailing wheel-bearing pivot axes 67a, 67b. In some instances, the obstacles can also cause the leading and/or trailing frame members 62a, 62b to pivot about, respectively, the leading and/or trailing pivot axes 58a, 58b. It is particularly with respect to the pivotal movement of the leading and trailing frame members 62a, 62b about the leading and trailing pivot axes 58a, 58b that the suspension system 100 will be described.

As mentioned above, when the track system 40 is not under load, the track system 40 is an unloaded configuration, such that the suspension system 100 is also in the unloaded configuration. When the suspension system 100 is in the unloaded configuration, the leading and trailing suspension members 102, 104 are in unloaded positions.

When the track system 40 is connected to the chassis of a vehicle and bears some of the weight of the vehicle, the suspension system 100 moves from the unloaded configuration (unloaded state) to the initial configuration (loaded state). More precisely, the leading frame member 62a pivots about the leading pivot axis 58a, and the trailing frame member 62b pivots about the trailing pivot axis 58b, such that the upper portion 63a moves toward the upper portion 63b. As a result, the leading and trailing suspension members 102, 104 move towards each other. Specifically, the connecting portion 110 moves relative to the receptacle portion 112, and the elongate part 162 moves the relative to the receptacle portion 112. These movements are, in part, enabled due to the resilient nature of the upper and lower resilient members 106a, 106b and the upper and lower connecting resilient members 140a, 140b. Eventually, the suspension system 100 reaches the initial configuration, in which the leading and trailing suspension members 102, 104 are in initial positions.

As the connecting portion 110 moves relative to the receptacle portion 112, towards one another, the upper and lower resilient connecting members 140a, 140b resiliently deform (i.e., compress). Upon deformation, the upper and lower resilient connecting members 140a, 140b bias the connecting and receptacle portions 110, 112 away from one another, back towards their unloaded positions. In other words, the upper and lower resilient connecting members 140a, 140b bias the leading and trailing suspension members 102, 104 back toward their unloaded positions. The engagement between the stopper 132 and the stopper receiving aperture 136 can assist in ensuring that the connecting portion 110 moves straight toward the receptacle portion 112 (i.e., not angled thereto).

Also, as the elongate part 162 moves relative to the receptacle part 112, where the elongate part 162 is further being received in the receptacle 113, the upper and lower resilient members 106a, 106b resiliently deform. The upper and lower resilient member 106a, 106b, at first, mostly undergo shear deformation as the shear modulus of rigidity is smaller than the compressive and tensile moduli. More precisely, the shear deformation occurs along a length of the upper and lower resilient members 106a, 106b. Upon deformation, the upper and lower resilient members 106a, 106b bias the elongate part 162 and the receptacle portion 112 back toward their unloaded positions. In other words, the upper and lower resilient members 106a, 106b bias the leading and trailing suspension members 102, 104 back toward their unloaded positions.

Thus, when the suspension system 100 is in the initial configuration, the upper and lower resilient connecting members 140a, 140b and the upper and lower resilient members 106a, 106b are resiliently deformed, and bias the suspension system 100 toward the unloaded configuration.

Then when the track system 40 encounters an obstacle that causes the leading frame member 62a to further pivot about the leading pivot axis 58a so that the upper portion 63a moves toward the upper portion 63b and/or causes the trailing frame member 62b to further pivot about the trailing pivot axis 58b so that the upper portion 63b moves toward the upper portion 63a, the leading and trailing suspension members 102, 104 further move towards each other, causing the upper and lower resilient connecting members 140a, 140b and the upper and lower resilient members 106a, 106b to further resiliently deform, similarly to what is described hereabove.

Figure 6B:
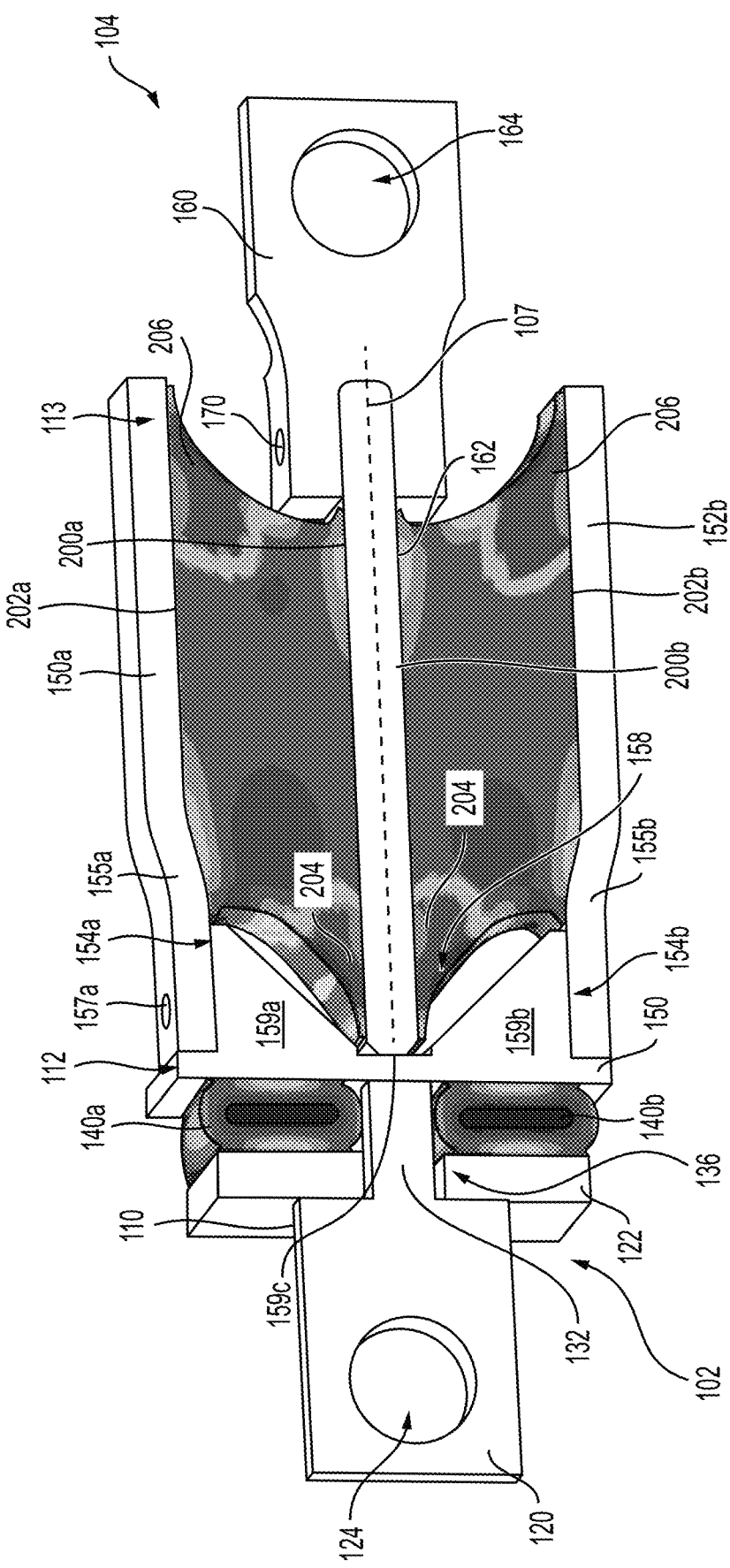
FIG. 6B is a cross-sectional view of the suspension system of FIG. 2 in a contracted configuration.

Eventually, the track system 40 can reach a contracted configuration, in which the suspension system 100 is also in the contracted configuration. The suspension system 100 is in the contracted configuration, when the stopper 59 that is received in the arcuate aperture 64b abuts the trailing frame member 62b. The stopper 59 limits the pivotal movement of the trailing frame member 62b. That, along with the suspension system 100 being in the contracted configuration, limit the pivotal movement of the leading frame member 62a. It is contemplated that in some embodiments, the pivotal movement of the leading frame member 62a could be limited differently, for instance, by engagement with the trailing frame member 62b. In some embodiments, as shown in FIG. 7B, when the suspension system 100 reaches the contracted configuration, the upper and lower resilient members 106a, 106b have a generally rectangular shape. In other embodiments, as shown in FIG. 6B, when the suspension system 100 reaches the contracted configuration, the upper and lower resilient members 106a, 106b generally have a parallelogram shape.

As the suspension system 100 moves toward the contracted configuration, the connecting portion 110 moves relative to the receptacle portion 112, and the elongate part 162 moves the relative to the receptacle portion 112. It is understood that in some instances, as the loads that the upper and lower resilient members 106a, 106b are subjected to increase, the elongate part 162 could, to some extent, move laterally outwardly from the receptacle 113 (i.e., laterally) and/or toward the upper or lower parts 152a, 152 (i.e., vertically), such that there could be misalignment between the leading and trailing suspension members 102, 104. In such instances, the upper and lower resilient members 106a, 106b are also subjected to tensile and compressive deformations.

Eventually, when the suspension system 100 reaches the contracted configuration, the leading and trailing suspension members 102, 104 reach corresponding contracted positions.

As the connecting portion 110 moves relative to the receptacle portion 112, the upper and lower connecting resilient members 140a, 140b further resiliently deform until the stopper 132 of the connecting portion 110 abuts the side part 150, at which point the movement of the connecting portion 110 relative to the receptacle portion 112 is stopped, which in the present embodiment coincides with the suspension system 100 reaching the contracted configuration (i.e., movement of the leading suspension member 102 relative to the trailing suspension member 104 is stopped). It is contemplated that in some embodiments, the stopper 132 could abut the trailing surface of the side part 150 before the suspension system 100 reaches the contracted configuration. In such embodiments, the upper and lower resilient members 106a, 106b continue to deform. Since the upper and lower connecting resilient members 140a, 140b are resiliently deformed, the upper and lower connecting resilient members 140a, 140b bias the connecting and receptacle portions 110, 112 toward their initial positions.

As the elongate part 162 moves relative to the receptacle portion 112, and is further received within the receptacle 113, the upper and lower resilient members 106a, 106b further resiliently deform. The elongate part 162 moves relative to the receptacle portion 112 (i.e., the upper and lower resilient members 106a, 106b resiliently deform) until a leading end of the elongate part 162 abuts the abutting channel 159c. Since the upper and lower resilient members 106a, 106b are deformed, the upper and lower resilient members 106a, 106b bias the elongate part 162 and the receptacle portion 112 back toward their initial positions. In instances where the upper and lower resilient members are subject to compressive and/or tensile deformation resulting from high loads, the elongate part 162 can move toward the upper or lower parts 152a, 152 and the side part 150 until the leading end of the elongate part 162 abuts the upper and/or lower tapered portions 159a, 159b. The upper and/or lower tapered portions 159a, 159b can then guide the leading end of the elongate part 162 toward the abutting channel 159c.

Due to the resilient nature of the upper and lower resilient members 106a, 106b and upper and connecting resilient members 140a, 140b, as the suspension system 100 approaches the contracted configuration, it becomes more difficult to contract the upper and lower resilient members 106a, 106b. This can, in some instances, assist in reducing vibrations, which can thereby result in a smoother ride, and enhance conformance with the terrain.

Referring to FIG. 6B, stresses within the upper and lower resilient members 106a, 106b are at their highest when the suspension system 100 is in the contracted configuration. Particularly, stresses are highest at the inner and outer fillets 204, 206. Thus, the presence of the inner and outer fillets 204, 206 provides additional material at the high stress locations, and can thus strengthen the upper and lower resilient members 106a, 106b, thereby reducing likelihood of the upper and lower resilient members 106a, 106b from failing.

Additionally, the presence of the fillets 204, 206 can stabilize the trailing suspension member 104 relative to the leading suspension 102. More precisely, the presence of the fillets 204, 206 can assist in reducing the movement of the elongate body 162 toward the upper and/or lower parts 152a, 152b when the suspension system 100 is subjected to stress.

Furthermore, the shape of the upper and lower resilient members 106a, 106b is such that in the contracted position, as shown in FIG. 6B, the resilient members 106a, 106b do not engage the connecting part 160 or the upper and lower tapered portions 159a, 159b.

Figure 7C:
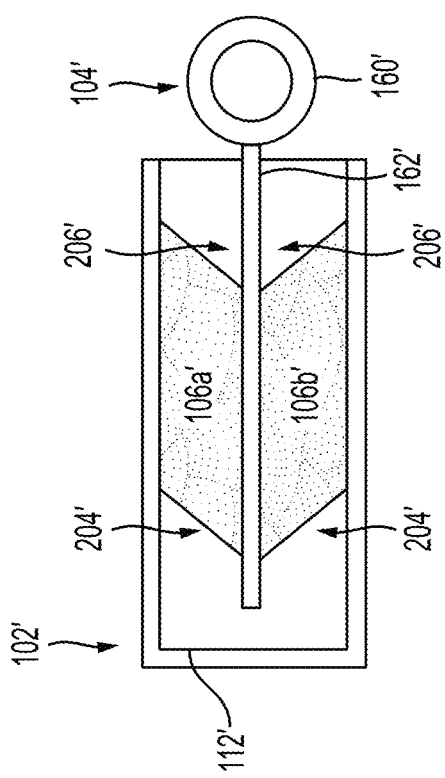
FIG. 7C is schematic side elevation view of an alterative embodiment of the suspension system of FIG. 2 in an unloaded configuration.

Referring to FIGS. 7C and 7B, in other implementations of the present technologies, a suspension system 100' could be configured to deform such that leading and trailing suspension members 102', 104' move away from one another instead of towards one another, and the upper and lower resilient members 106a, 106b resiliently deform and bias the upper and lower trailing suspension members 102', 104' back towards one another. In such embodiments, inner and outer fillets 204', 206' of the upper and lower resilient members are oriented opposite to the inner and outer fillets 204, 206 to accommodate for the deformation in the other direction. A stopper could limit the relative movement of the leading and trailing suspension members 102', 104'.

As mentioned above, in some instances, as loads that the resilient members are subjected to are increased, there may be misalignment between the leading and trailing suspension members 102, 104. In order to minimize the misalignment between the leading and trailing suspension members 102, 104, for example due to the buckling of the resilient members 140 and/or due to the shearing of the upper and lower resilient members 106a, 106b, a guiding portion can be included to guide and limit the movement of one of the leading and trailing suspension members 102, 104 relative to the other one of the leading and trailing suspension members in a direction other than the longitudinal direction.

For example, this guide portion can be in the form of a plate extending from one of the leading and trailing suspension members toward the other one of the leading and trailing suspension members, a pin engaging and sliding in a hole.

In one embodiment, the guiding of the leading suspension member 102 relative to the trailing suspension member 104 can be provided by the shape of the resilient connecting members 140 which can, instead of being prismatic, be donut shaped, and receive a portion of at least one of the leading and trailing suspension members 102, 104 therein.

In other words, with reference to FIG. 6B, the resilient connecting members 140a, 140b could be replaced by a single donut shaped connecting member that is configured to receive the stopper 132 through a central aperture of the donut shaped connecting member, so that the donut-shaped connecting member guides the movement of the leading suspension member 102 relative to the trailing suspension member 104.

Another way to minimize the risk of misalignment between the leading and trailing suspension members 102, 104 can be to minimize friction at their pivotal connection with their respective frame member, such as by adding lubricated bushings or by using rotary joints.

The various components of the track system 40 are made of conventional materials (e.g., metals and metal alloys in most cases, such as steel) via conventional manufacturing processes (e.g., casting, molding, etc.). The present technology does not require any specific materials nor methods of manufacture. The present technology merely requires that each component be suitable for the purpose for which it is intended and the use to which it is to be put. Any material(s) or method(s) of manufacture which produce such components may be used in the present technology.

Figure 8:
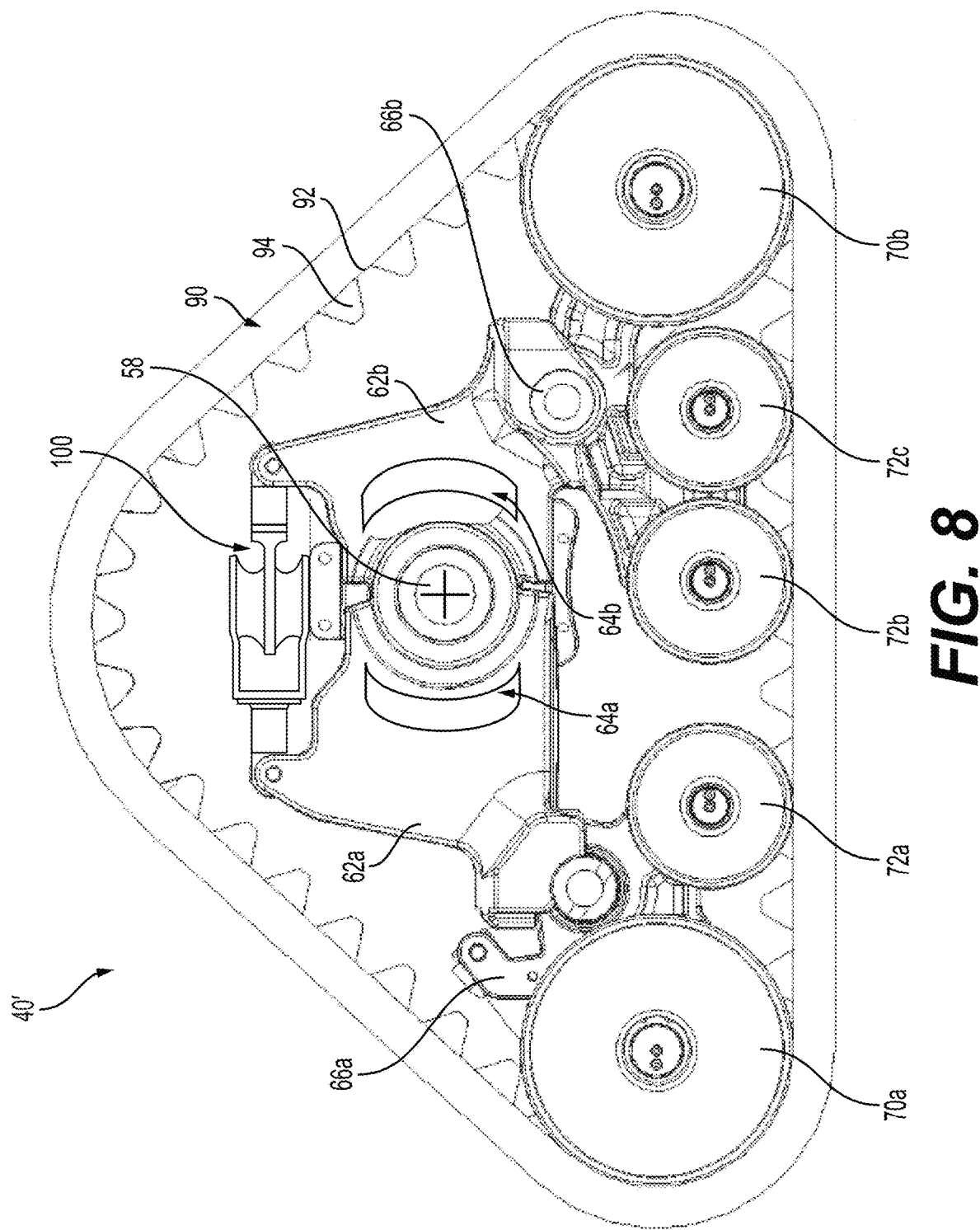
FIG. 8 is a left side elevation view of an alternate embodiment of a track system with a suspension system according to an embodiment of the present technology.

Referring now to FIG. 8, it is understood that the suspension system 100 could be used with other track systems having different configurations without departing from the scope of the present technology. For example, as shown in FIG. 8, the suspension system 100 is used with a track system 40'. Features of the track system 40' that are similar to those of the track system 40 have been labeled with the same reference numerals and will not be described in detail again. The track system 40' notably differs from the track system 40 in that the leading and trailing frame member 62a, 62b pivot about a single, same pivot axis 58' (instead of two distinct leading and trailing pivot axes 58a, 58b). The track system 40' is described in greater detail in U.S. Pat. No. 10,343,734B2, the entirety of which is incorporated by reference herein. The suspension system 100 could, in some embodiments, be connected between a frame member and a wheel-bearing frame member. In some embodiments, the suspension system 100 could include a protective cover for protecting the suspension system 100, notably the upper and lower resilient members 106a, 106b from debris and/or elements. In some embodiments, the protective cover could be a silicone cover or another elastomeric cover.

Figure 9:
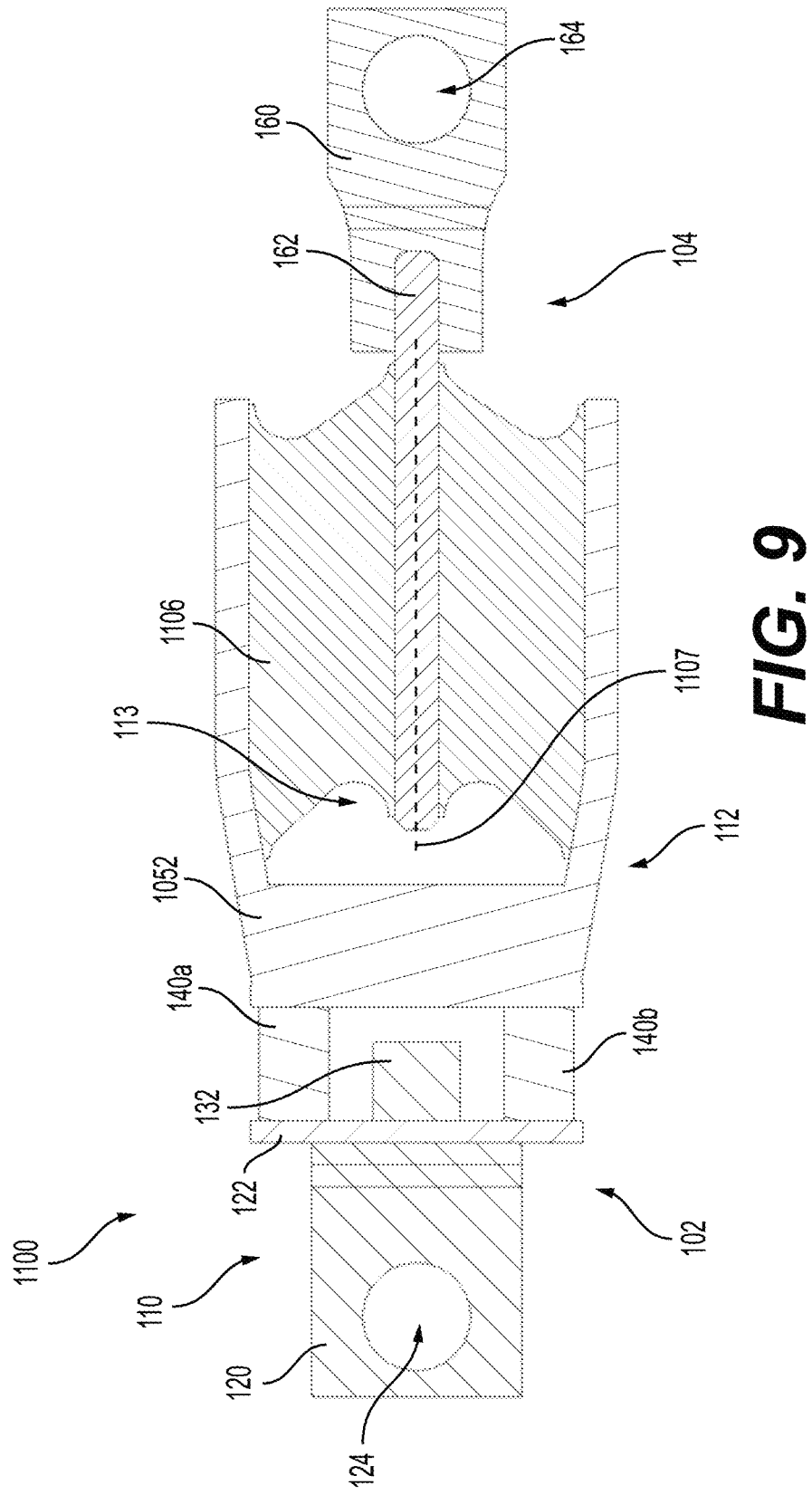
FIG. 9 is a cross-sectional view of an alternate embodiment of the suspension system of FIG. 2.

Referring now to FIG. 9, an alternative embodiment of the suspension system 100, namely suspension system 1100, will now be described. Features of the suspension system 1100 similar to those of the suspension system 100 have been labeled with the same reference numerals and will not be described again. FIG. 9 shows a cross-sectional view of the suspension system 1100, which notably differs from the suspension system 100 in that the upper and lower resilient members 106a, 106b have been replaced with a single cylindrical resilient member 1106 which extends along axis 1107. The cylindrical resilient member 1106, which surrounds the elongate part 162, can provide more stability than the two upper and lower resilient members 106a, 106b, in that it is less likely for the elongate part 162 to move laterally or vertically. Additionally, the cylindrical resilient member 1106 can assist in reducing chances of debris infiltrating the suspension system. Furthermore, in this embodiment, the receptacle portion 112 is integral such that the side wall 150 and the upper and lower walls 152a, 152b have been replaced by a surrounding wall 1052 that is generally tubular. In some embodiments, the suspension system 1100 can be more compact than the suspension system 100. In some embodiment, the suspension system 1100 could further include shims disposed between the connecting portion 110 and the receptacle portion 112. In other embodiments, shims could be disposed elsewhere along the suspension system 1100. The shims can be useful for compensating against compression set.

Figure 10:
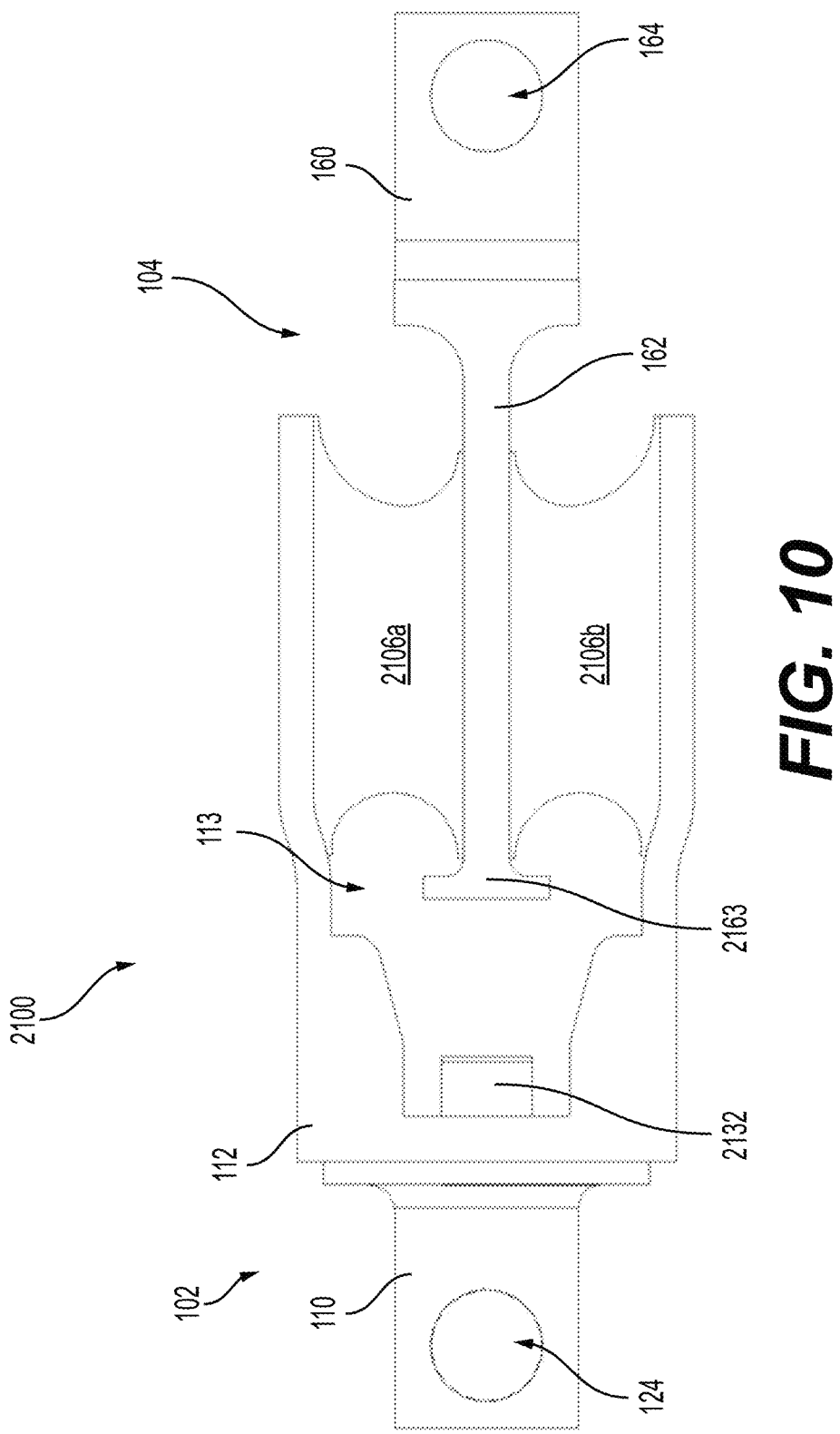
FIG. 10 is a left side elevation view of an alternate embodiment of the suspension system of FIG. 2.

Referring now to FIG. 10, an alternative embodiment of the suspension system 100, namely suspension system 2100, will now be described. Features of the suspension system 2100 similar to those of the suspension system 100 have been labeled with the same reference numerals and will not be described again. In the suspension system 2100, the leading suspension member 102 is one integral member, such that the connecting portion 110 and the receptacle portion 112 are integral. More specifically, the connecting portion 110 is a single piece, such that the frame connecting part 120, the receptacle connecting part 122, and the upper and lower connecting resilient members 140a, 140b are omitted. Additionally, the stopper 132 has been replaced with a resilient stopper 2132 that is disposed within the receptacle 113, and that is configured to engage an abutting head 2163 of the elongate part 162. Similarly, the trailing suspension member 104 is also one integral member, such that the connecting part 160 and the elongate part 162 are integral. Also, the shape of upper and lower resilient members 2106a, 2106b has been optimized to be effective whether the leading and trailing suspension members 102, 104 move away or towards one another. In other words, the upper and lower resilient members 2106a, 2106b no longer generally define a parallelogram. In this embodiment, as the suspension system 2100 moves towards the contracted configuration (i.e., the leading suspension member 102 moves relative to the trailing suspension member 104), the abutting head 2163 eventually abuts the resilient stopper 2132 and causes the resilient stopped 2132 to deform (compress). Upon deformation, the resilient stopper 2132 dampens the movement of the leading suspension member 102 relative to the trailing suspension member 104. Furthermore, the resilient stopper 2132, along with the upper and lower resilient members 106a, 106b bias leading and trailing suspension members 102, 104 towards their initial position. The suspension system 2100 reaches the contracted configuration when the resilient stopper 2132 can no longer be compressed. In other embodiments, the suspension system 2100 could reach the contracted configuration before the resilient stopper 2132 can no longer be compressed.

Figure 11:
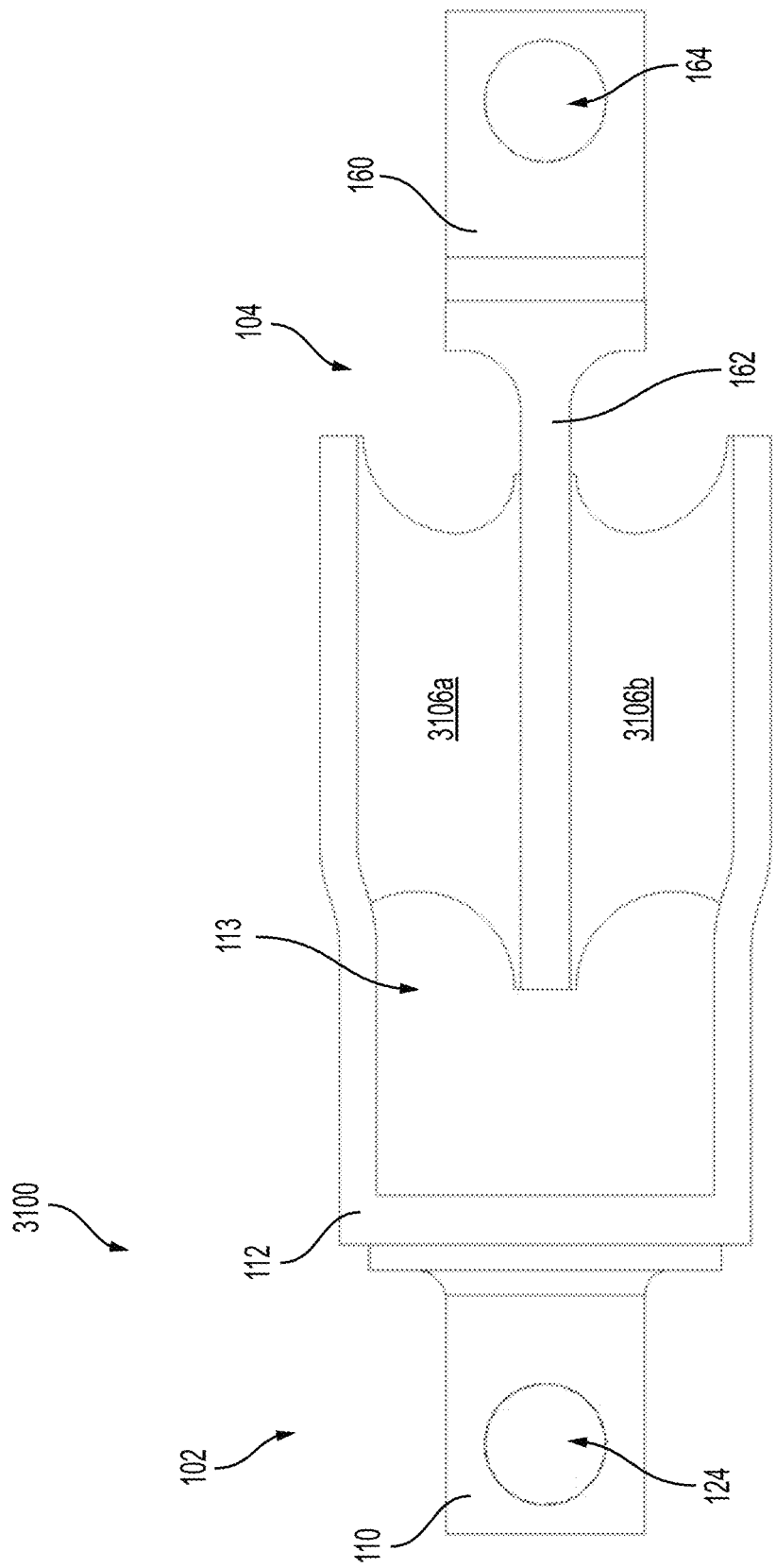
FIG. 11 is a left side elevation view of an alternate embodiment of the suspension system of FIG. 2.

Referring now to FIG. 11, an alternative embodiment of the suspension system 100, namely suspension system 3100, will now be described. Features of the suspension system 3100 similar to those of the suspension system 100 have been labeled with the same reference numerals and will not be described again. In the suspension system 3100, the leading suspension member 102 is one integral member, such that the connecting portion 110 and the receptacle portion 112 are integral. More specifically, the connecting portion 110 is a single piece, such that the frame connecting part 120, the receptacle connecting part 122, the stopper 132, and the upper and lower connecting resilient members 140a, 140b are omitted. Similarly, the trailing suspension member 104 is also one integral member, such that the connecting part 160 and the elongate part 162 are integral. The upper and lower resilient members 3106a, 3106b have been oriented for the leading and trailing suspension members 102, 104 to move away from one another. In this embodiment, the suspension system 3100 is in the contracted position when the leading end of the elongate part 162 abuts the receptacle portion 112.

Figure 12:
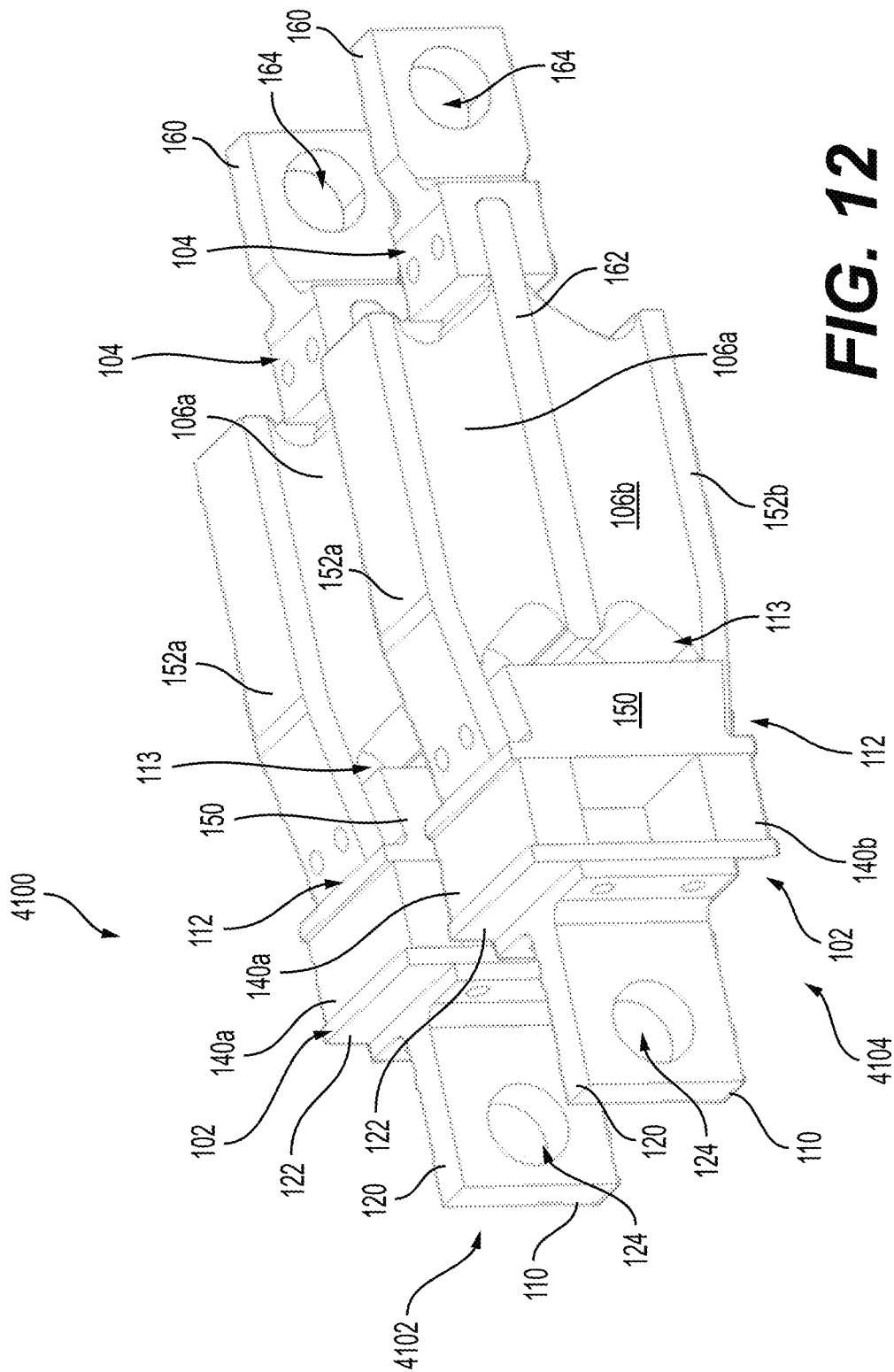
FIG. 12 is a perspective view taken from a top, front, left of an alternate embodiment of the suspension system of FIG. 2.

Referring now to FIG. 12, an alternative embodiment of the suspension system 100, namely suspension system 4100, will now be described. Features of the suspension system 4100 similar to those of the suspension system 100 have been labeled with the same reference numerals and will not be described again. In this embodiment, the suspension system 4100 includes a suspension system 4102 and a suspension system 4104 that are connected in parallel to the leading and trailing frame members 62a, 62b. Each of the suspension systems 4102, 4104 is identical to the suspension system 100. It is contemplated that in some embodiments, the 4100 could include two or more suspension systems 100. In some embodiments, the upper and lower resilient members 106a, 106b could differ from one embodiment to another. Having the two suspension systems 4102, 4104 connected in parallel can help modulate the overall biasing effects of the suspension system 4100 in a given footprint. It is contemplated that in some embodiments of the suspension system 4100, one or more components of the two suspension systems 4102, 4104 could be integral. For example, the suspension system 4100 could have a single leading and/or trailing suspension member, but two or more resilient members.

Figure 13:
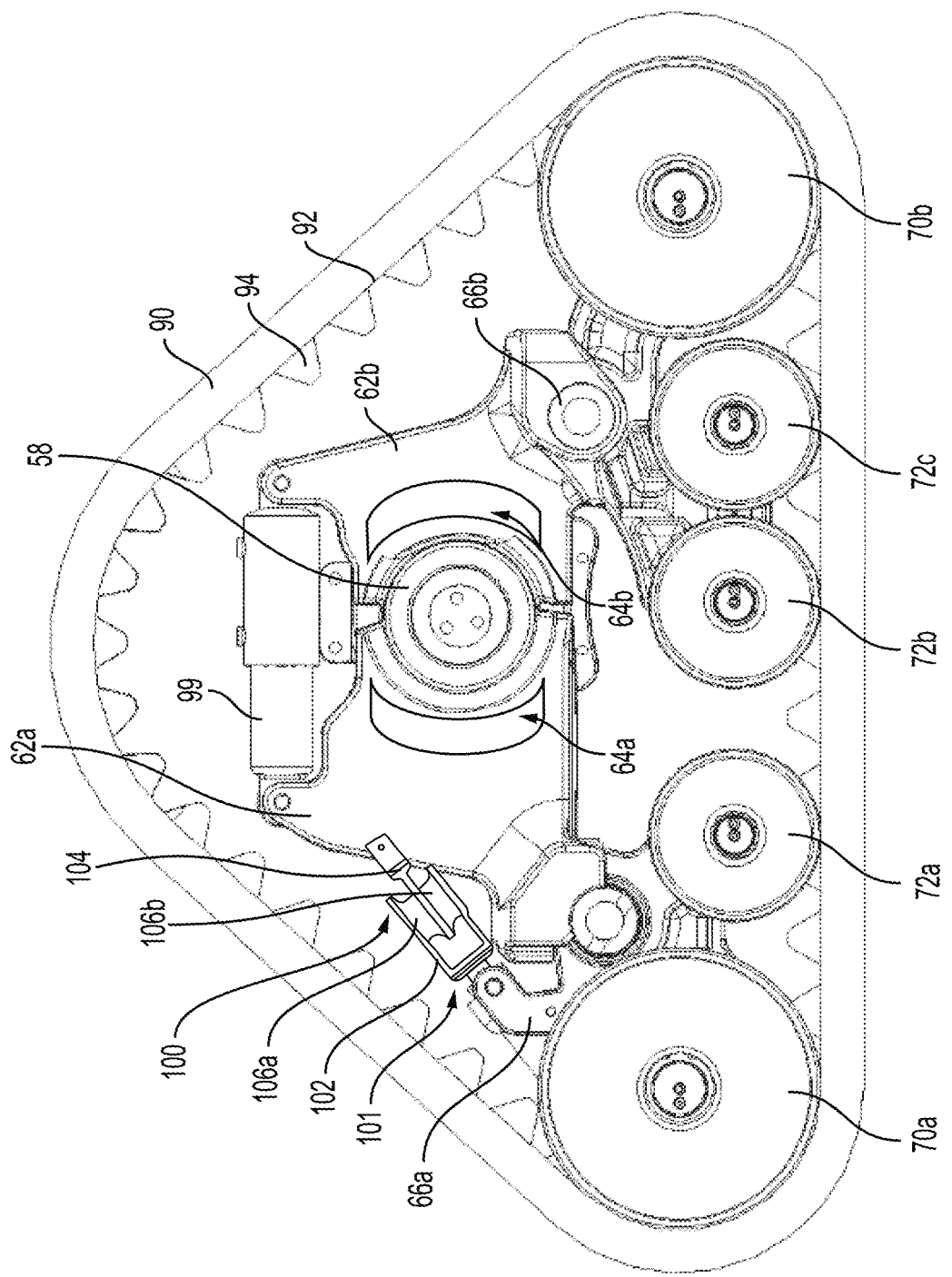
FIG. 13 is a side elevation view of a track system having a suspension system according to an embodiment of the present technology.

As mentioned above, although the present technology is described as being a suspension system pivotally connected to two frame members of a frame assembly, it is understood that the present technology could be used differently. For instance, as shown in FIG. 13, in an alternative embodiment of the track system 40, namely track system 42, the suspension system 100 is part of a tensioner assembly 101 and is pivotally connected the leading frame member 62a and to the leading wheel-bearing frame member 66a. More specifically, the leading suspension member 102 is pivotally connected to the leading wheel-bearing frame member 66a, and the trailing suspension member 104 is pivotally connected to leading frame member 62a. In the track system 42, the leading and trailing frame members 62a, 62b are connected to a shock absorber 99. It is understood that in some embodiments, frame assembly 60 could be different. For instance, the frame assembly 60 could not have two pivotally connected frame members. When the suspension system 100 is used as a tensioner, the upper and lower resilient members 106a, 106b, in the initial position, bias the leading wheel-bearing frame member 66a away from the leading frame member 62a such that tension in the endless track 90 is increased.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A suspension system for a track system, the suspension system comprising:

a first suspension member pivotally connectable to a frame assembly of the track system, the first suspension member defining a receptacle;

a second suspension member pivotally connectable to the frame assembly of the track system, the second suspension member extending at least partially within the receptacle and being moveable relative to the first suspension member;

a resilient member having a first surface and a second surface, the first surface being generally fixedly connected to the second suspension member and the second surface being generally fixedly connected to the first suspension member; and the first and second suspension members have a first position, and in response to the first and second suspension members being offset from the first position, the resilient member biases the first and second suspension members toward the first position;

wherein the frame assembly includes a first frame member and a second frame member, the first and second frame members being pivotally connected to one another about a first pivot.

2. The suspension system of claim 1, wherein in response to the first suspension member moving relative to the second suspension member, the resilient member undergoes at least shear deformation.

3. The suspension system of claim 2, wherein the resilient member undergoes shear deformation along a length of the resilient member.

4. The suspension system of claim 1, wherein the resilient member includes a first fillet at the first surface and a second fillet at the second surface.

5. The suspension system of claim 1, wherein the resilient member is generally conical, and the first and second suspension members are generally cylindrical.

6. The suspension system of claim 1, wherein the resilient member is a first resilient member having the first surface and the second surface, and the suspension system further includes a second resilient member having a third surface and a fourth surface, wherein:

the first surface of the first resilient member is connected to the second suspension member and the second surface of the first resilient member is connected to the first suspension member; and the third surface of the second resilient member is connected to the second suspension member and the fourth surface of the second resilient member is connected to the first suspension member.

7. The suspension system of claim 6, wherein the first and second resilient members are symmetrical about a longitudinally extending symmetry plane disposed between the first and second resilient members.

8. The suspension system of claim 6, wherein the first and second resilient members each generally define a parallelogram shape when in the first position and a rectangular shape when in the second position.

9. The suspension system of claim 1, wherein the first suspension member includes:

a first portion pivotally connectable to the frame assembly of the track system;

a second portion defining the receptacle, the second portion being operatively connected to the first portion; and the first portion being moveable relative to the second portion.

10. The suspension system of claim 9, wherein a connecting resilient member is disposed between the first and second portions.

11. The suspension system of claim 10, wherein in response to the first suspension member moving relative to the second suspension member, the first portion moves relative to the second portion, and the connecting resilient member undergoes a deformation.

12. The suspension system of claim 11, wherein the resilient member and the connecting resilient member are arranged in series.

13. The suspension system of claim 9, further including a stopper for stopping the movement of the first portion relative to the second portion.

14. The suspension system of claim 1, further including a stopper for stopping the movement of the first suspension member relative to the second suspension member.

15. The suspension system of claim 14, wherein the stopper is made of a resilient material.

16. The suspension system of claim 1, further including a layer made of ultra-high-molecular-weight polyethylene disposed between the resilient member and at least one of the first and second suspension members.

17. The suspension system of claim 1, further including a guiding portion to guide and limit the relative movement of the first and second suspension members in a direction other than an axial direction.

18. The suspension system of claim 1, further including a protective cover protecting the suspension system from debris.

19. A track system comprising:
the frame assembly including:
the first frame member; and
the second frame member pivotally connected to the first frame member, and
the suspension system according to claim 1, the suspension system being operatively connected to the first and second frame members;
a sprocket wheel assembly rotationally connected to the frame assembly;
a plurality of support wheel assembly rotationally connected to the frame assembly, and
an endless track surrounding the frame assembly, the suspension system, the sprocket wheel assembly and the plurality of support wheel assembly.

20. A track system comprising:
an attachment assembly having a first lateral pivot and a second lateral pivot;
the frame assembly disposed on a lateral side of the attachment assembly, the frame assembly including:
the first frame member pivotally connected to the first lateral pivot; and
the second frame member pivotally connected to the second lateral pivot, and the suspension system according to claim 1, the suspension system being operatively connected to the first and second frame members;
a sprocket wheel assembly rotationally connected to the frame assembly;
a plurality of support wheel assembly rotationally connected to the frame assembly, and
an endless track surrounding the frame assembly, the suspension system, the sprocket wheel assembly and the plurality of support wheel assembly.

* * * * *